(12) United States Patent
Manabe

(10) Patent No.: US 9,464,402 B2
(45) Date of Patent: Oct. 11, 2016

(54) CONSTRUCTION MACHINE

(71) Applicant: HITACHI CONSTRUCTION MACHINERY CO., LTD., Tokyo (JP)

(72) Inventor: Takeo Manabe, Ishioka (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 664 days.

(21) Appl. No.: 13/798,841

(22) Filed: Mar. 13, 2013

(65) Prior Publication Data

US 2013/0259624 A1 Oct. 3, 2013

(30) Foreign Application Priority Data

Mar. 28, 2012 (JP) .................................. 2012-73447

(51) Int. Cl.
| E02F 9/08 | (2006.01) |
| E02F 3/36 | (2006.01) |
| E02F 9/18 | (2006.01) |
| E02F 9/26 | (2006.01) |
| B60R 11/04 | (2006.01) |
| E05C 19/14 | (2006.01) |

(52) U.S. Cl.
CPC ............... *E02F 3/36* (2013.01); *B60R 11/04* (2013.01); *E02F 9/0891* (2013.01); *E02F 9/18* (2013.01); *E02F 9/26* (2013.01); *E05C 19/14* (2013.01)

(58) Field of Classification Search
CPC ...... E02F 9/0891; E02F 3/36; B66F 9/07527
USPC .......................................................... 414/687
See application file for complete search history.

(56) References Cited

U.S. PATENT DOCUMENTS

| 6,615,942 B2 * | 9/2003 | Shinohara | B62D 25/10 180/69.21 |
| 7,537,256 B2 * | 5/2009 | Gates | B60Q 1/56 296/1.07 |
| 2012/0146361 A1 * | 6/2012 | Nagami | E02F 9/0858 296/190.09 |

FOREIGN PATENT DOCUMENTS

| JP | 2006-336361 A | 12/2006 |
| JP | 2008-150832 A | 7/2008 |
| JP | 2010-031552 A | 2/2010 |

* cited by examiner

Primary Examiner — Gerald McClain
Assistant Examiner — Ronald Jarrett
(74) Attorney, Agent, or Firm — Mattingly & Malur, PC

(57) ABSTRACT

An engine cover comprises a top surface part covering an engine from above and a rear surface part hanging down from a rear end of the top surface part and making contact with a top surface of a counterweight. A lock device is provided between the engine cover and the counterweight for locking the engine cover to the counterweight. The rear surface part of the engine cover is recessed toward the engine side to provide a lock device-accommodating recessed portion for accommodating the lock device. A camera opening is provided in an upper position of the lock device-accommodating recessed portion, and the rear-view camera is mounted to an inner surface side of the engine cover in a position corresponding to the camera opening.

6 Claims, 16 Drawing Sheets

CONSTRUCTION MACHINE

TECHNICAL FIELD

The present invention relates to a construction machine such as a hydraulic excavator equipped with a rear-view camera for monitoring the backward thereof, for example.

BACKGROUND ART

In general, a hydraulic excavator as a typical example of a construction machine comprises an automotive lower traveling structure, an upper revolving structure swingably mounted on the lower traveling structure, and a working mechanism mounted in a front side of the upper revolving structure in the front-rear direction to be capable of tilting up and down.

The upper revolving structure is configured by a revolving frame forming a support structure, a cab which is located in a front side of the revolving frame and onto which an operator gets, a counterweight located in a rear side of the revolving frame to act as a weight balance to the working mechanism, a prime mover such as an engine positioned in a front side of the counterweight and mounted on the revolving frame to drive a hydraulic pump, and a prime mover cover formed of a top surface part covering the prime mover from above, and a rear surface part hanging down from a rear end of the top surface part and making contact with a top surface of the counterweight (Patent Document 1).

The prime mover cover is configured such that a front portion of the top surface part is mounted to a structural body forming a part of the revolving frame by using a hinge member. Thereby the prime mover cover is provided to be rotatable (openable and closable) in the upper-lower direction with the front portion acting as the fulcrum.

On the other hand, Patent Document 2 and Patent Document 3 disclose a construction machine in which a rear-view camera (rear-monitoring camera) for shooting the backward of an upper revolving structure is provided on a top surface of a counterweight. According to this configuration, even in a case where an operator seated on an operator's seat cannot directly confirm the backward of the upper revolving structure visually, the operator can confirm a visual image of the rear-view camera displayed on a display device provided near the operator's seat or the like, thereby smoothly performing a traveling operation of the construction machine, a revolving operation of the upper revolving structure, and the like.

PRIOR ART DOCUMENTS

Patent Documents

Patent Document 1: Japanese Patent Laid-Open No. 2010-31552 A
Patent Document 2: Japanese Patent Laid-Open No. 2006-336361 A
Patent Document 3: Japanese Patent Laid-Open No. 2008-150832 A

SUMMARY OF THE INVENTION

Incidentally, according to Patent Document 2 and Patent Document 3, the rear-view camera is accommodated (stored) in an exclusive cover for the rear-view camera mounted on the top surface in the rear end side of the counterweight. The exclusive cover can prevent gravel, earth and sand, stones, rocks, and the like from directly colliding with the rear-view camera, as well as protect the rear-view camera from irregular disassembling and stealing.

In a case of this configuration, however, when an operator who gets onto a cab confirms the backward visually, the exclusive cover blocks the view of the operator, creating a possibility of increasing a dead zone of the operator's view. The exclusive cover is required to be formed sturdily for protecting the rear-view camera from falling stones and the like, as well as to provide a mechanism for protecting the rear-view camera from irregular disassembling and stealing, therefore creating a possibility of increasing costs. Further, there is a problem that since the exclusive cover projects from the top surface of the counterweight, for example, it is more likely to receive external forces due to collision with falling stones and the like, which makes it difficult to secure endurance of the exclusive cover.

It should be noted that for preventing the rear-view camera and the exclusive cover from projecting from the counterweight, for example, it is conceived that a recessed portion recessed downward is provided in a rear end side of the top surface in the counterweight and the rear-view camera is located in the recessed portion. That is, the rear-view camera is located in the recessed portion provided in the counterweight, and an opening of the recessed portion is covered with the exclusive cover having a shape formed along the front surface of the counterweight. In this case, however, for ensuring the view of the rear-view camera, it is required to increase a size of the recessed portion, thus creating a possibility of leading to reduction in volume and weight of the counterweight, as well as a possibility that a forming work of the counterweight becomes troublesome.

In view of the above-discussed problem with the conventional art, it is an object of the present invention to provide a construction machine which can protect a rear-view camera from collision with gravel, stones and like, irregular disassembling, stealing, and the like without providing an exclusive cover for the rear-view camera.

(1) According to the present invention, a construction machine comprises an automotive lower traveling structure; an upper revolving structure swingably mounted on the lower traveling structure; and a working mechanism mounted in the upper revolving structure to be capable of tilting up and down; the upper revolving structure comprises: a revolving frame forming a support structure; a counterweight located in a rear side of the revolving frame to act as a weight balance to the working mechanism; a prime mover positioned in a front side of the counterweight and mounted on the revolving frame to drive a hydraulic pump; a prime mover cover including a top surface part covering the prime mover from above and a rear surface part hanging down from a rear end of the top surface part and making contact with a top surface of the counterweight; a lock device provided between the counterweight and the prime mover cover for lockably/unlockably locking the prime mover cover to the counterweight in a state where the prime mover cover is closed; and a rear-view camera provided in the prime mover cover for shooting the backward of the upper revolving structure.

In order to solve the aforementioned problem, characteristic of a configuration adopted by the present invention is that a lock device-accommodating recessed portion for accommodating the lock device is provided on the rear surface part of the prime mover cover by recessing the rear surface part toward the prime mover in a position corresponding to the lock device, a camera opening is provided in an upper position of the lock device-accommodating recessed portion, and the rear-view camera is mounted to an inner surface side of the prime mover cover in a position corresponding to the camera opening.

With this arrangement, since the rear-view camera is provided in the inner surface side of the prime mover cover, even if the exclusive cover for the rear-view camera is not provided, the rear-view camera can be protected from collision with earth and sand, stones, rocks and the like by the prime mover cover having sufficient rigidity and strength. Protection of the rear-view camera from irregular disassembling and stealing can be performed by the lock device for locking the prime mover cover to the counterweight without separately providing a protection mechanism thereto exclusive for the rear-view camera.

Accordingly, the exclusive cover for the rear-view camera and the mechanism for protecting the rear-view camera from irregular disassembling and stealing can be omitted (eliminated) to reduce costs due to installation of the rear-view camera. In addition to it, this configuration has no possibility that the view of the operator is blocked by the exclusive cover for the rear-view camera as conventional art, making it possible to reduce the dead zone when the operator views the backward virtually. Further, since it is not required to provide the recessed portion in the counterweight, a reduction in volume and weight of the counterweight can be prevented.

On the other hand, a lock device-accommodating recessed portion recessed to a side of the prime mover is provided in the rear surface part of the prime mover cover, and the rear-view camera is mounted in the upper position of the lock device-accommodating recessed portion in a position corresponding to the camera opening. Therefore the section for mounting the rear-view camera can be provided not to project backward from the rear surface part of the prime mover cover to reduce collision of the peripheral section of the rear-view camera with falling stones and the like. Since the lock device-accommodating recessed portion is recessed to the side of the prime mover, the view of the rear-view camera can be widely ensured from the camera opening provided in the upper position of the lock device-accommodating recessed portion.

(2) According to the present invention, the camera opening is configured to be opened obliquely downward in the upper position of the lock device-accommodating recessed portion. With this configuration, the rear-view camera can be arranged in the obliquely downward direction. As a result, the rear-view camera can shoot the vicinity of the rear end edge in the counterweight at the backward of the upper revolving structure to prevent the surroundings of the rear end edge in the counterweight from becoming the dead zone of the rear-view camera.

(3) According to the present invention, it is configured such that the lock device comprises: a striker provided in the rear surface part of the prime mover cover; a bracket which is provided on a top surface of the counterweight and a rear side of which is formed as a latch mounting surface; and a latch mounted on the latch mounting surface of the bracket to be engaged to the striker.

With this arrangement, since the striker and the latch can be engaged outside of the prime mover cover, the adjusting work of the engagement state between the striker and the latch can be easily performed with visual contact. In addition to it, the lock device can be accommodated in the lock device-accommodating recessed portion not to project from the rear surface part of the prime mover cover. As a result, the lock device can be prevented from interfering with obstacles in the surroundings.

(4) According to the present invention, it is configured such that the striker in the lock device is mounted to the lock device-accommodating recessed portion, and in a state where the latch is engaged to the striker for locking the prime mover cover, the camera opening is opened upward of the latch. With this arrangement, in a state where the latch is engaged to the striker, it is possible to restrict for the latch to block the view of the rear-view camera.

(5) According to the present invention, it is configured such that in a state of locking the prime mover cover to the counterweight, the lock device is inclined to come closer to the side of the prime mover toward the upward side for not blocking the view of the rear-view camera. With this configuration, the lock device can widen the view of the rear-view camera under the rear-view camera. Therefore even if the lock device is arranged under the rear-view camera, the view of the rear-view camera can be ensured to reduce the dead zone thereof.

(6) According to the present invention, it is configured such that a cover side bracket is fixed to an inner surface side of the prime mover cover, and a camera side bracket is mounted to the cover side bracket in such a manner that a mounting angle thereof can be adjusted in the upper-lower direction, the rear-view camera is fixed to the camera side bracket, and is thereby angularly adjustably mounted to the prime mover cover through the camera side bracket and the cover side bracket.

With this arrangement, the rear-view camera can be mounted to the prime mover cover in a desired angle and in a desired view, even if a degree of dimension accuracy of the prime mover cover or a degree of mounting accuracy of the cover side bracket (without maintaining a higher degree of accuracy) is reduced. Therefore an individual difference in the mounting position of the rear-view camera can be reduced, and a reduction in costs due to the installation of the rear-view camera can be made.

(7) According to the present invention, it is configured such that an inner cover for covering the rear-view camera is mounted to the cover side bracket. Therefore the inner cover can protect the rear-view camera from heat of the prime mover. In this case, since the inner cover is not required to be as strong as to endure collision with earth and sand, stones, rocks and the like, the inner cover can be made of a material in a low cost .

BRIEF DESCRIPTION OF THE DRAWINGS

FIG. 8 is a partially cut-out, exploded perspective view showing an engine cover, a cover side bracket, a camera side bracket, a rear-view camera, an inner cover, and the like.

MODE FOR CARRYING OUT THE INVENTION

Hereinafter, a crawler type hydraulic excavator equipped with an engine will be taken as a typical example of a construction machine according to an embodiment of the present invention, which will be in detail explained with reference to the accompanying drawings.

Figure 1:
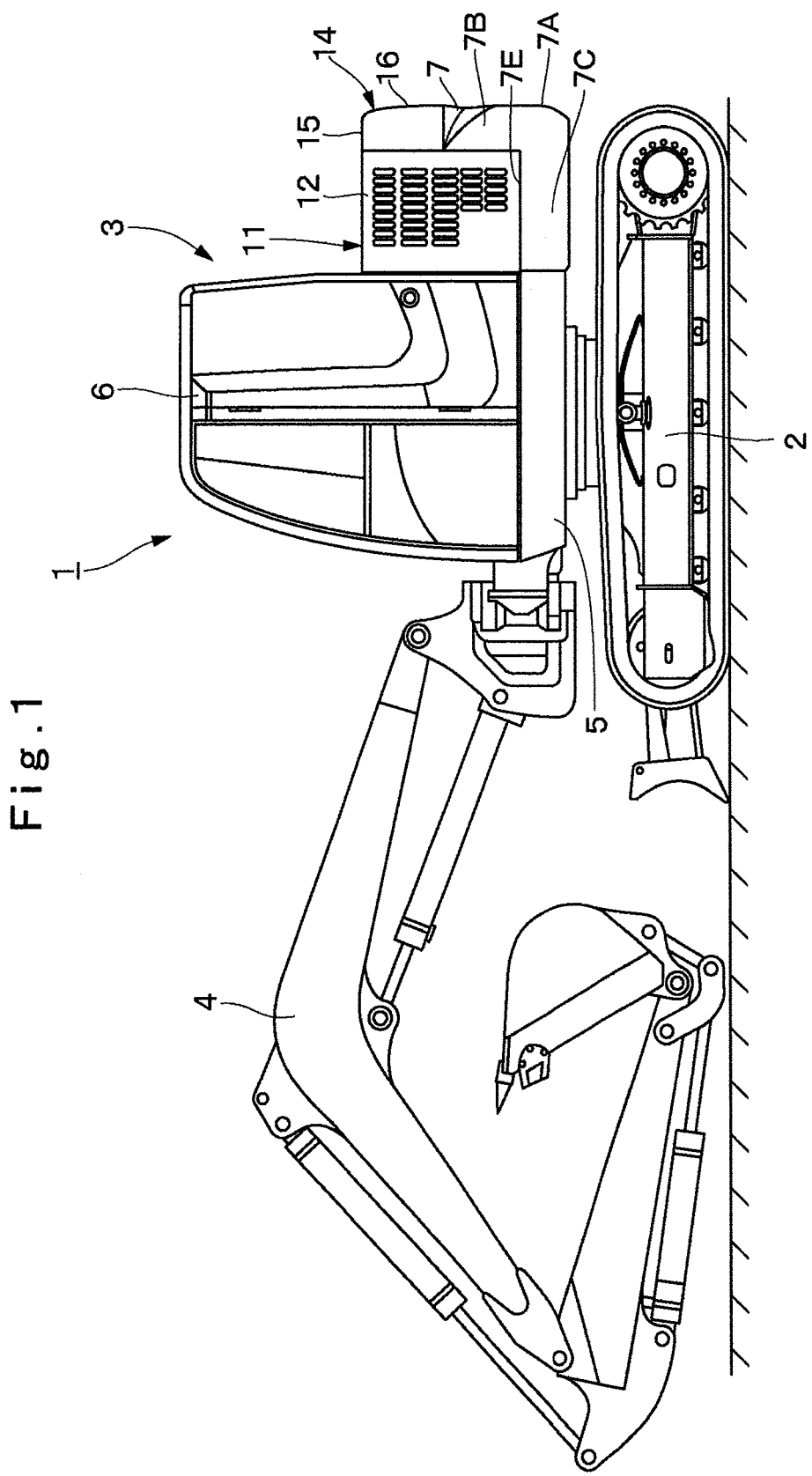
FIG. 1 is a front view showing a hydraulic excavator applied to an embodiment of the present invention.

In FIG. 1, designated at 1 is a compact hydraulic excavator of a crawler type as a construction machine. The hydraulic excavator 1 is configured by an automotive crawler type lower traveling structure 2, an upper revolving structure 3 swingably mounted on the lower traveling structure 2, and a working mechanism 4 provided in a front side of the upper revolving structure 3 in the front-rear direction to be capable of rocking, as well as tilting up and down, so as to perform the operation of excavating earth and sand.

Figure 2:
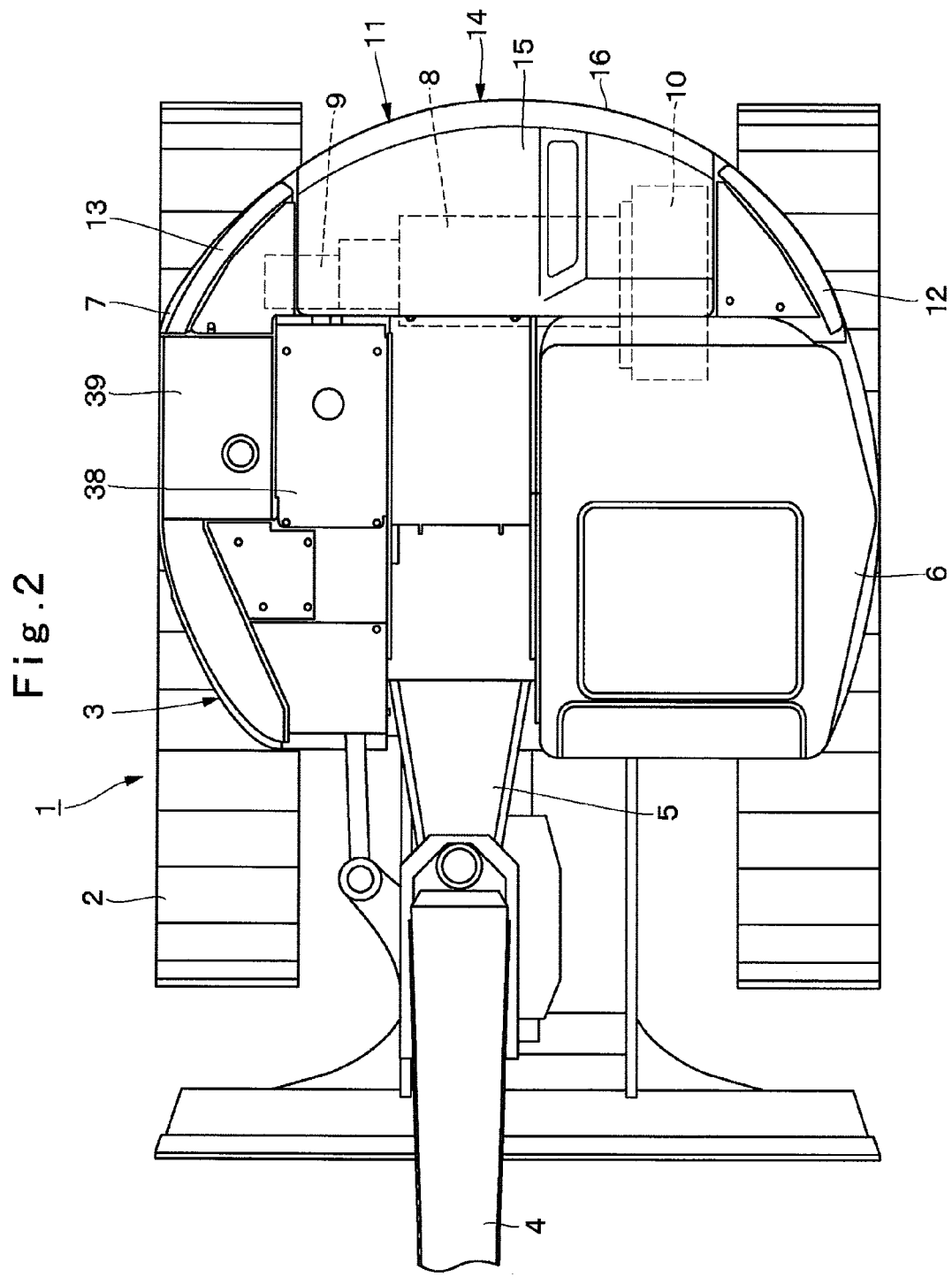
FIG. 2 is an enlarged plan view showing the hydraulic excavator in a state where a part of a working mechanism is omitted.

Here, as shown in FIG. 2, the hydraulic excavator 1 is configured as a small revolving machine which the upper revolving structure 3 of which can revolve in a small revolving diameter. The upper revolving structure 3 of this case is formed in a substantially circular shape as viewed from above and is formed in a compact size as a whole.

The upper revolving structure 3 is configured by the revolving frame 5 forming a support structure, a cab 6, a counterweight 7, an engine 8, an exterior cover 11, a rear-view camera 17, a lock device 27 and the like provided on the revolving frame 5, which will be described later. The working mechanism 4 is mounted to the front side of the revolving frame 5 to be capable of rocking, as well as tilting up and down. On the other hand, a cover support member 5A (refer to FIG. 6) is provided in the rear side of the revolving frame 5 to be positioned closer to the front side of the engine 8. The cover support member 5A is formed of an angular tubular body extending in the left-right direction to be positioned above the engine 8, for example, and a front side portion of a top surface part 15 in an engine cover 14 is mounted on a top surface of the cover support member 5A through a hinge member 15B to be described later.

The cab 6 is mounted in the left front side of the revolving frame 5 and the cab 6 is formed as a box body extending in the upper-lower direction. The cab 6 is provided for an operator to get onto, and an operator's seat for an operator to be seated therein, a control lever for traveling and a control lever for working (none of them are shown) are disposed inside the cab 6. A display device (not shown) such as a monitor is provided in the cab 6 to be positioned near an operator's seat (for example, in front of it). An image shot by the rear-view camera 17 to be described later is displayed on the display device. Therefore the operator can operate the hydraulic excavator 1 in the cab 6, and can monitor (confirm) the backward of the counterweight 7 with the image displayed on the display device.

The counterweight 7 is mounted in the rear side of the revolving frame 5, and the counterweight 7 acts as a weight balance to the working mechanism 4, and is formed as a heavy load. Here, the counterweight 7, for the purpose of making a revolving diameter thereof at a revolving operation small, has an outer peripheral surface 7A in an arc shape formed by bending both of left and right sides thereof toward the front side. Therefore the counterweight 7 is arranged for the left end portion to be positioned close to the rear portion of the cab 6, and for the right end portion to be positioned close to the rear portion of a fuel tank 39 to be described later.

Figure 3:
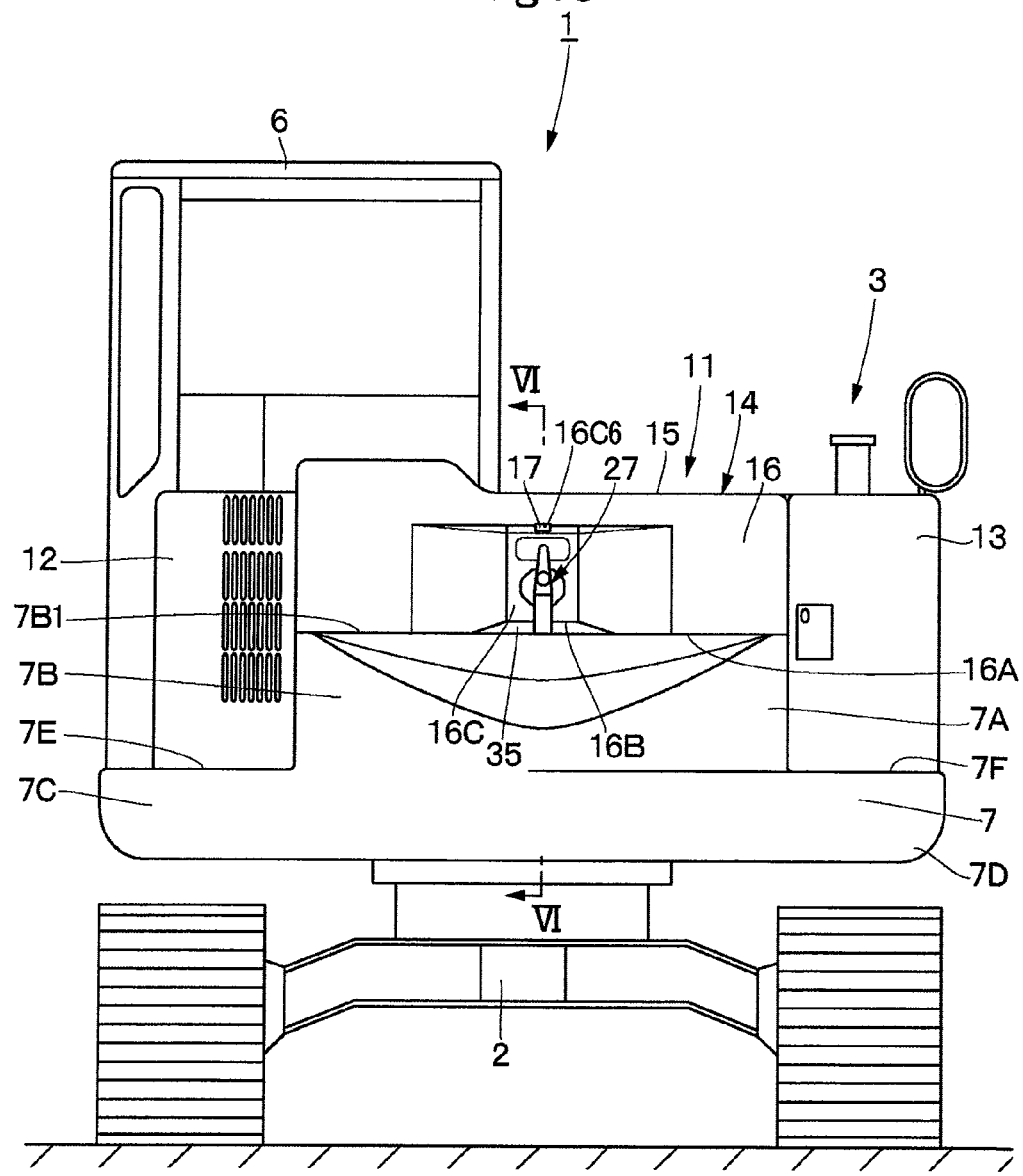
FIG. 3 is a rear view shown by enlarging the hydraulic excavator from a rear side.
Figure 4:
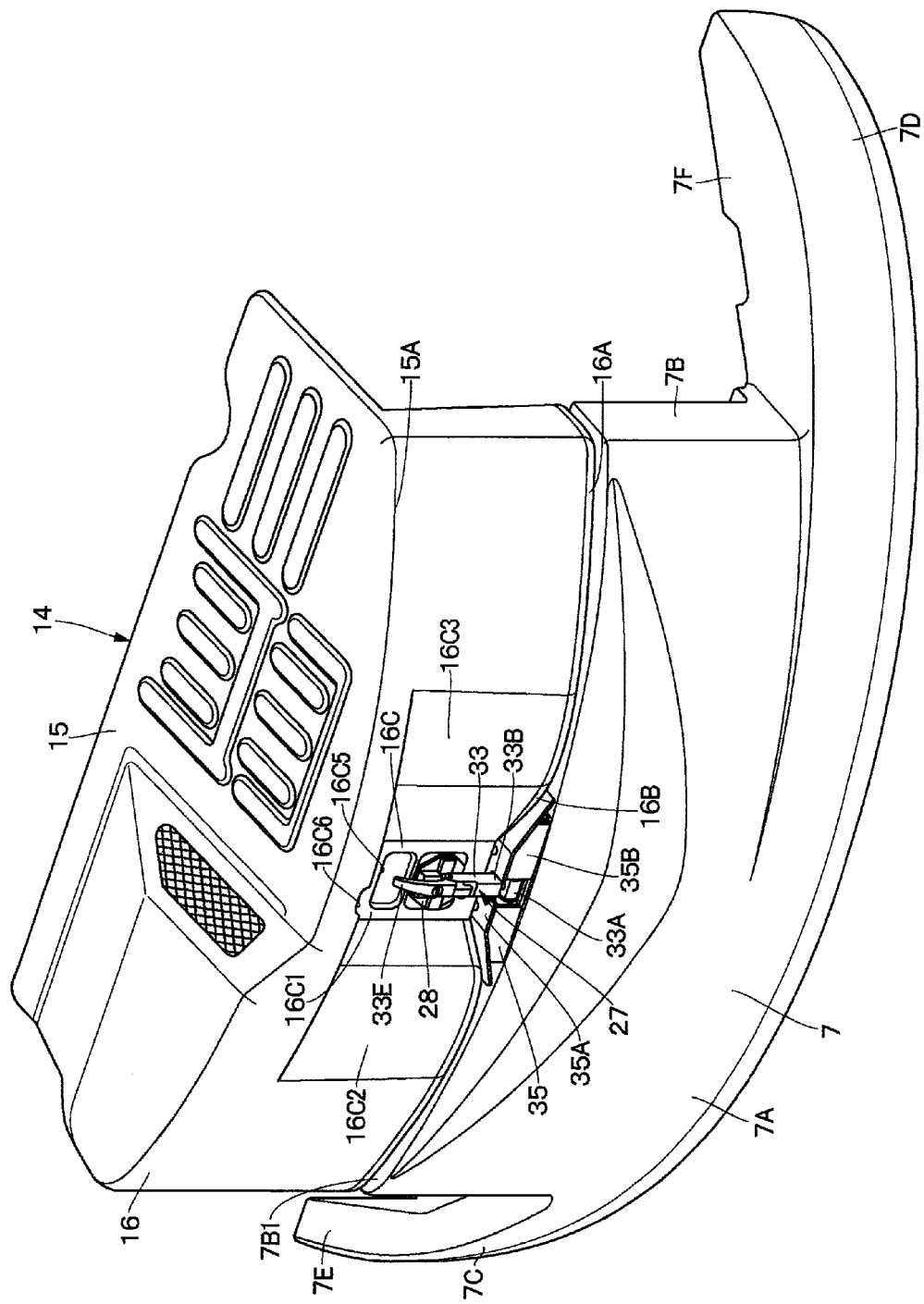
FIG. 4 is an external perspective view showing a state where an engine cover is closed and a lock device is locked, as viewed from an oblique rear side.

As shown in FIG. 3 and FIG. 4, the arc-shaped counterweight 7 is configured by a center weight portion 7B positioned in the center in the left-right direction, a left weight portion 7C positioned in the left side of the center weight portion 7B and formed to have a height dimension lower than that of the center weight portion 7B and a right weight portion 7D positioned in the right side of the center weight portion 7B and formed to have a height dimension lower than that of the center weight portion 7B. The center weight portion 7B projects backward and the left and right weight portions 7C and 7D extend in the left-right direction from the center weight portion 7B and are curved forward. Therefore a left door mounting portion 7E is formed in the left side of the counterweight 7 by a step between the center weight portion 7B and the left weight portion 7C. On the other hand, a right door mounting portion 7F is formed in the right side of the counterweight 7 by a step between the center weight portion 7B and the right weight portion 7D.

Figure 5:
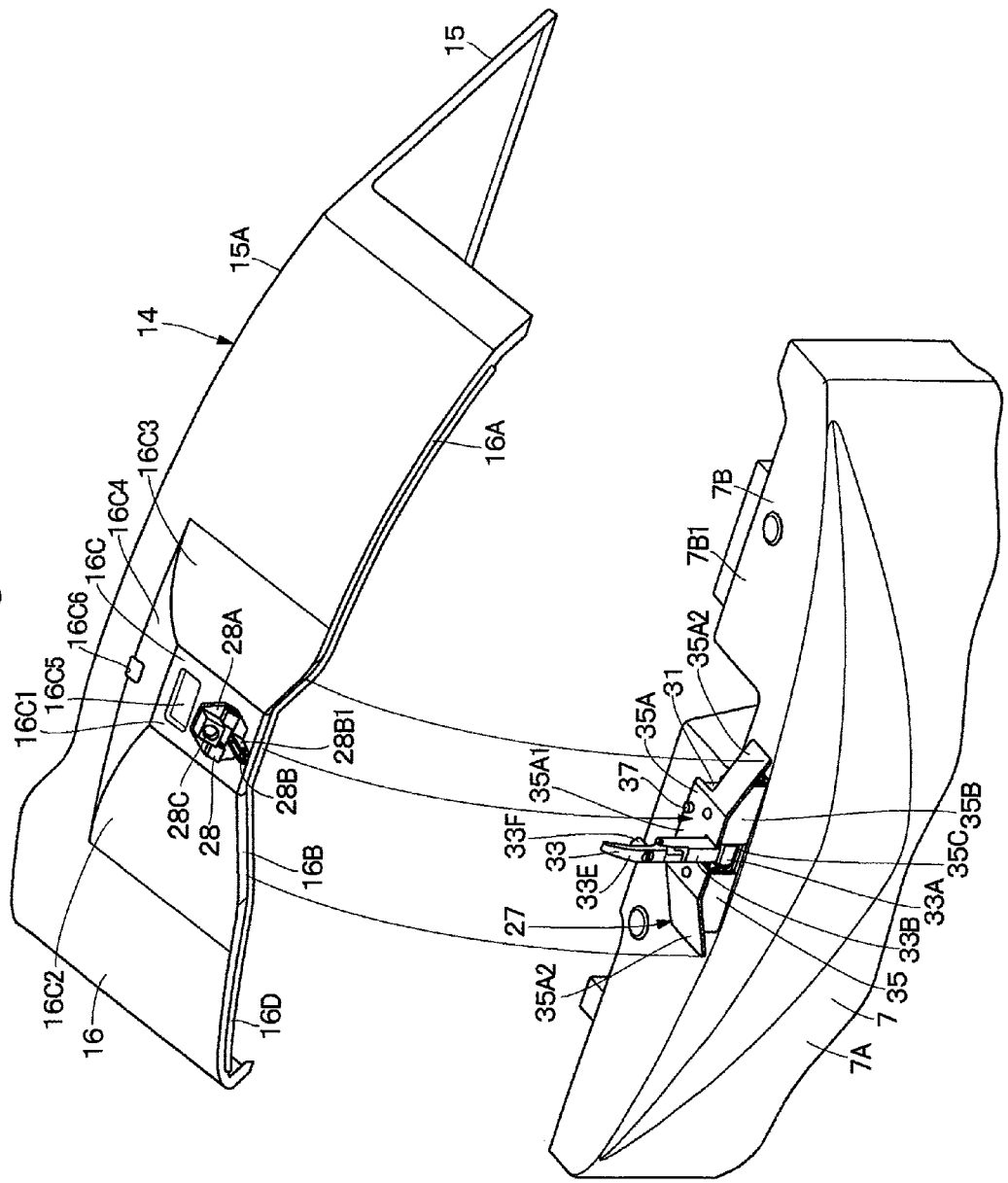
FIG. 5 is an external perspective view showing a part of a counterweight and the lock device in a state where the engine cover is opened, as viewed from an oblique rear side.
Figure 13:
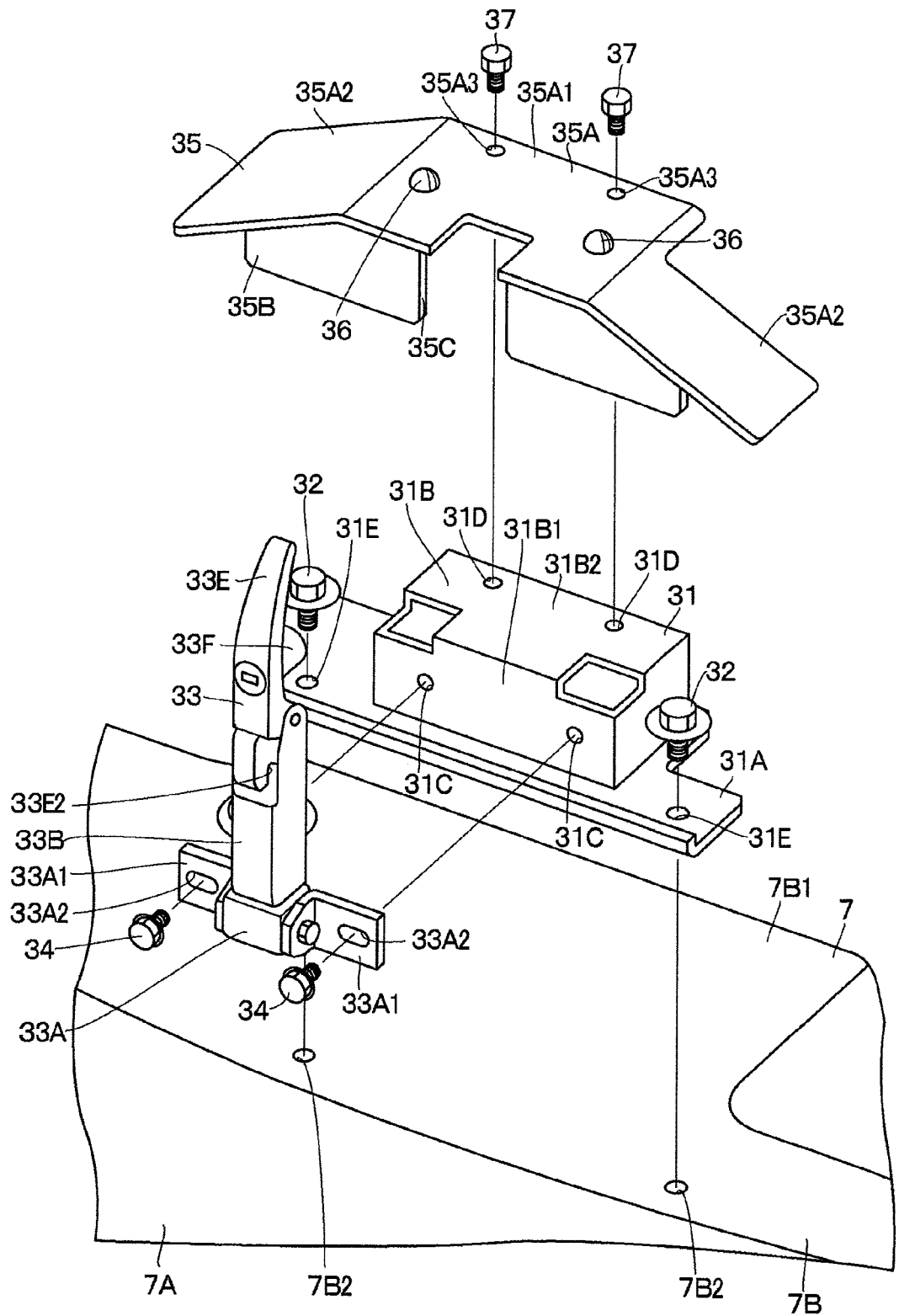
FIG. 13 is an exploded perspective view showing of a bracket, a latch, a hiding member and the like in the lock device.

Here, as shown in FIG. 5 and FIG. 13, the center weight portion 7B in the counterweight 7 has a top surface 7B1 which is formed in a substantially flat shape and is provided with two female screw holes 7B2 (see FIG. 13) formed in the center portion of the left-right direction of top surface 7B1 and in a position closer to the rear side thereof to have an interval in the left-right direction therebetween. Bracket bolts 32 for fixing a bracket 31 to be described later are threaded into the two female screw holes 7B2.

Figure 6:
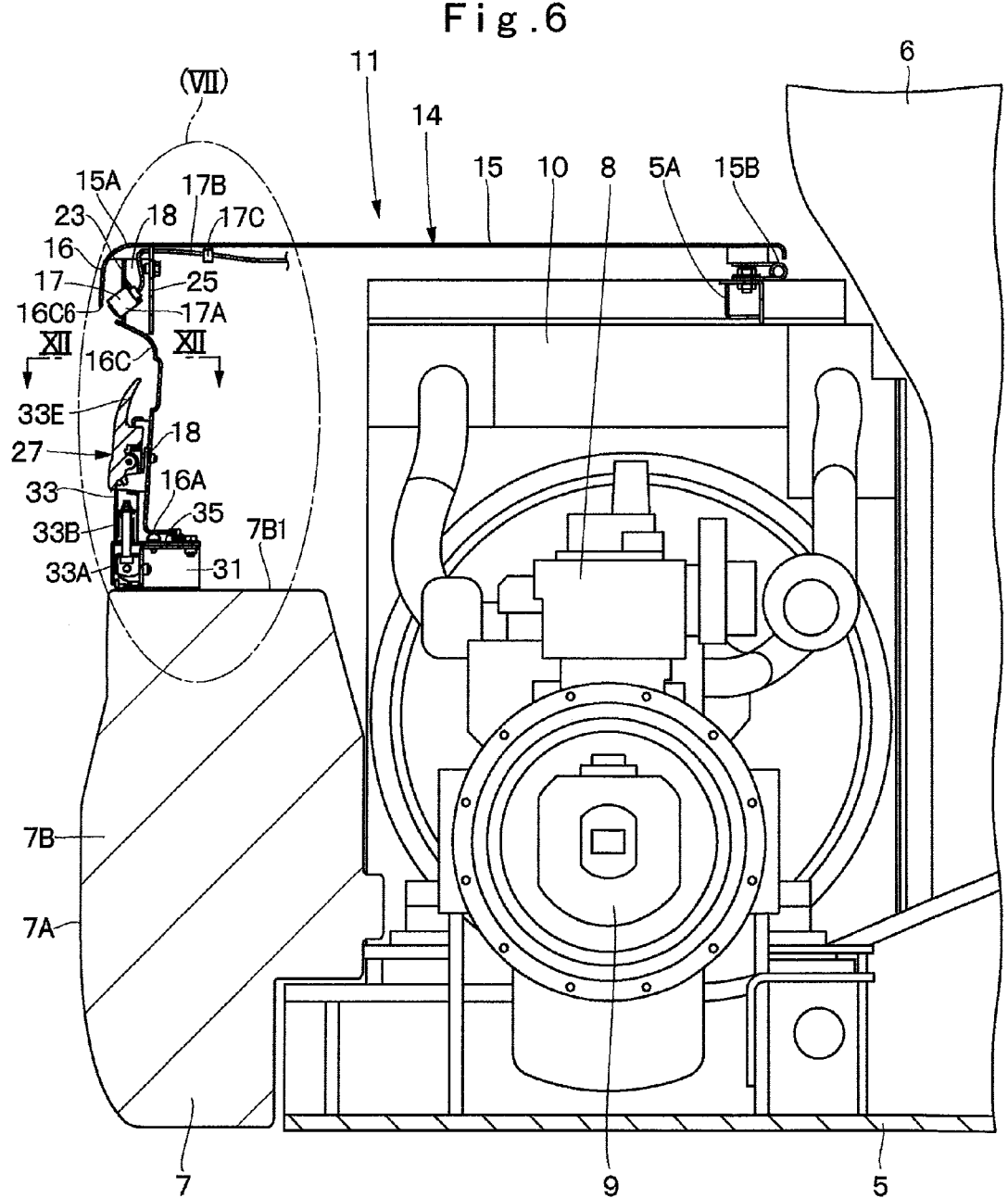
FIG. 6 is an enlarged cross section as viewed in the direction of arrows VI-VI in FIG. 3.

Indicated at 8 is the engine as the prime mover positioned in front (front surface side) of the counterweight 7 and mounted on the revolving frame 5 (refer to FIG. 2 and FIG. 6). The engine 8 is located in a transverse state extending in the left-right direction, and is mounted to the rear side of the revolving frame 5 through a vibration isolating mount. A hydraulic pump 9 driven by the engine 8 is mounted in the right side of the engine 8, and a heat exchanger 10 such as a radiator, an oil cooler or the like are disposed in the left side of the engine 8.

The exterior cover 11 is provided on the revolving frame 5 to be positioned between the cab 6 and the counterweight 7, and is arranged to cover the engine 8, the hydraulic pump 9, the heat exchanger 10 and the like. The exterior cover 11 is configured by a left side door 12, a right side door 13 and the engine cover 14, which will be described later.

As shown in FIG. 3, the left side door 12 is provided in the left front side of the counterweight 7, and is formed as an openable and closable door extending upward from a left door lo mounting portion 7E. On the other hand, the right side door 13 is provided in the right front side of the counterweight 7, and is formed as an openable and closable door extending upward from a right door mounting portion 7F.

Designated at 14 is the engine cover as a prime mover cover provided to be positioned between the left and right side doors 12 and 13. The engine cover 14 is arranged to cover a range from the cab 6 and an operating oil tank 38 to be described later to the counterweight 7, and the engine cover 14 is formed by performing bending work to a metallic thin plate. That is, as shown in FIG. 6, the engine cover 14 is configured by the top surface part 15 extending in the front-rear direction and in the left-right direction so as to cover the engine 8 from above, and a rear surface part 16 hanging down from a rear end 15A in an arc shape of the top surface part 15. The top surface part 15 has a front portion rotatably (openably and closably) mounted to the cover support member 5A of the revolving frame 5 through the hinge member 15B.

Figure 7:
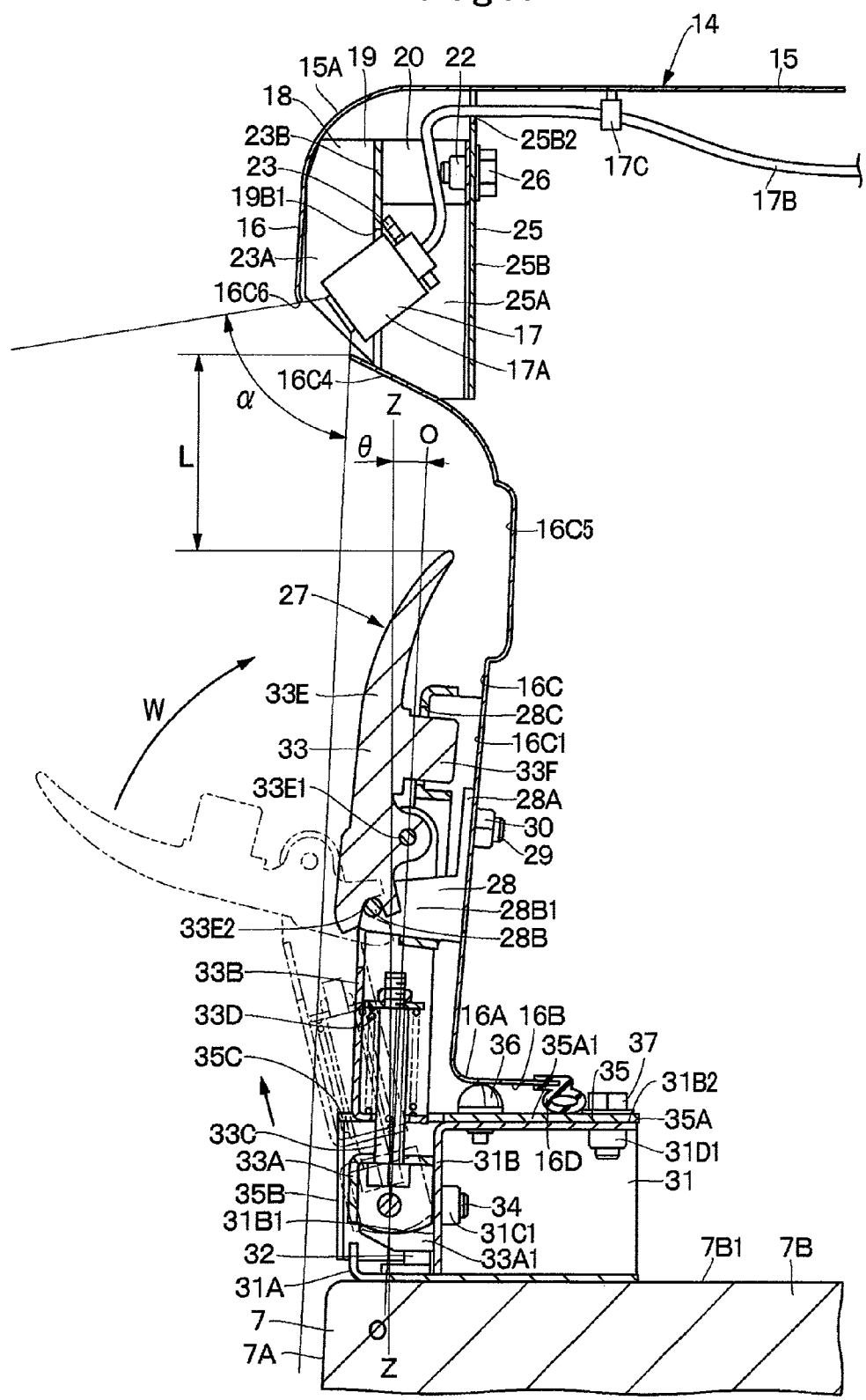
FIG. 7 is an enlarged cross section showing a (VII) portion in FIG. 6.
Figure 8:
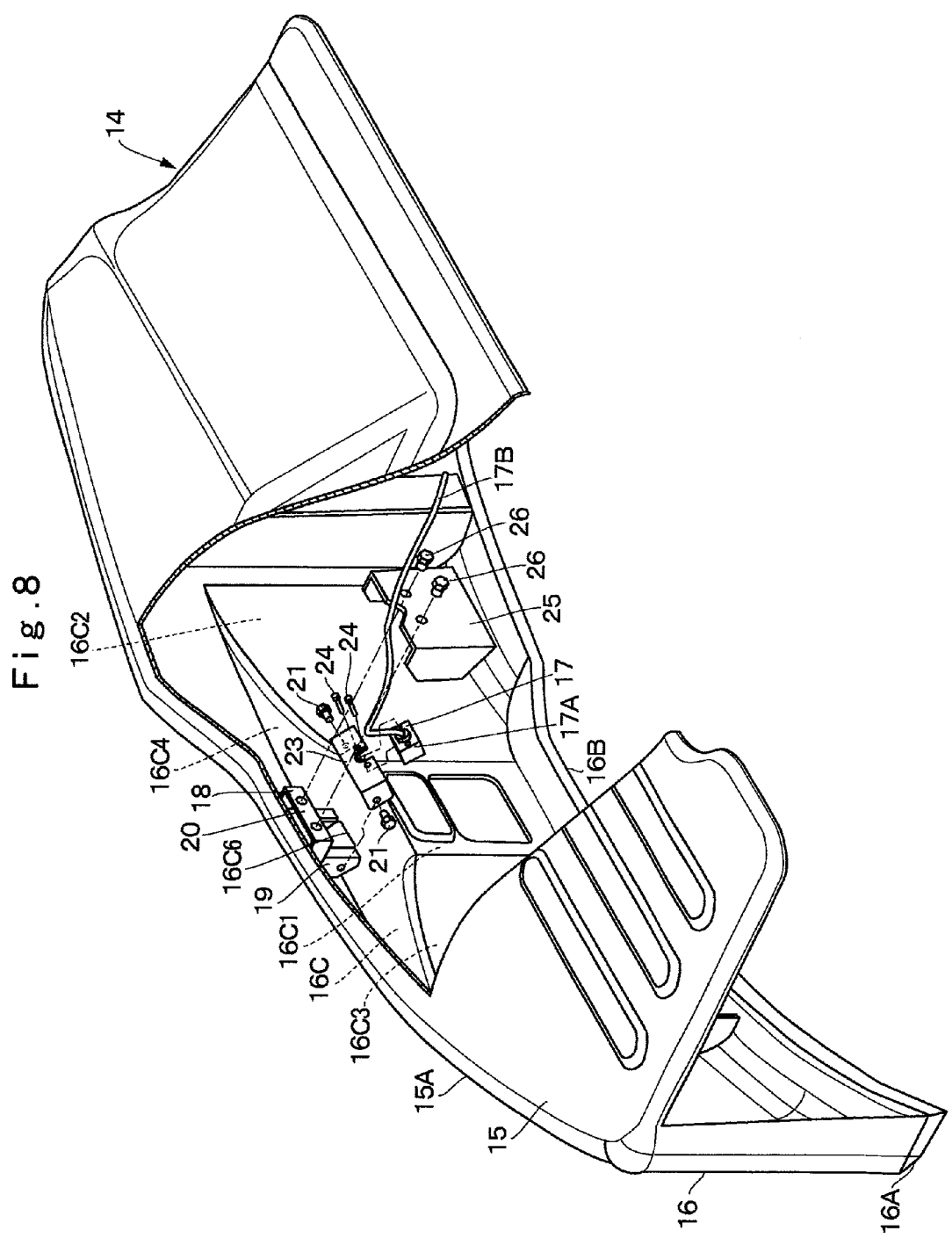

On the other hand, as shown in FIG. 5 and FIG. 7, a lower side of the rear surface part 16 in the engine cover 14 is bent toward the engine 8 side (inner direction) to form a lower end portion 16A, and a seal member 16D to be described later is mounted in a distal end of the lower end portion 16A. The lower end portion 16A of the rear surface part 16 has a center portion of the entire length extending in the left-right direction making contact with a top surface of a hiding member 35 to be described later and a large part of the other making contact with the top surface 7B1 of the center weight portion 7B.

Here, as shown in FIG. 4 and FIG. 5, a trapezoidal notched portion 16B is formed in a lower end side of the rear surface part 16 to be positioned in the center of the left-right direction corresponding to the lock device 27 to be described later. The notched portion 16B is structured for the hiding member 35 to be fitted therein in a state where the engine cover 14 is closed. Therefore the rear surface part 16 can eliminate a clearance between the lower end portion 16A and the hiding member 35, and is located to prevent hiding member bolts 37 to be described later fixing the hiding member 35 from being visible from outside in a state where the engine cover 14 is closed.

Figure 12:
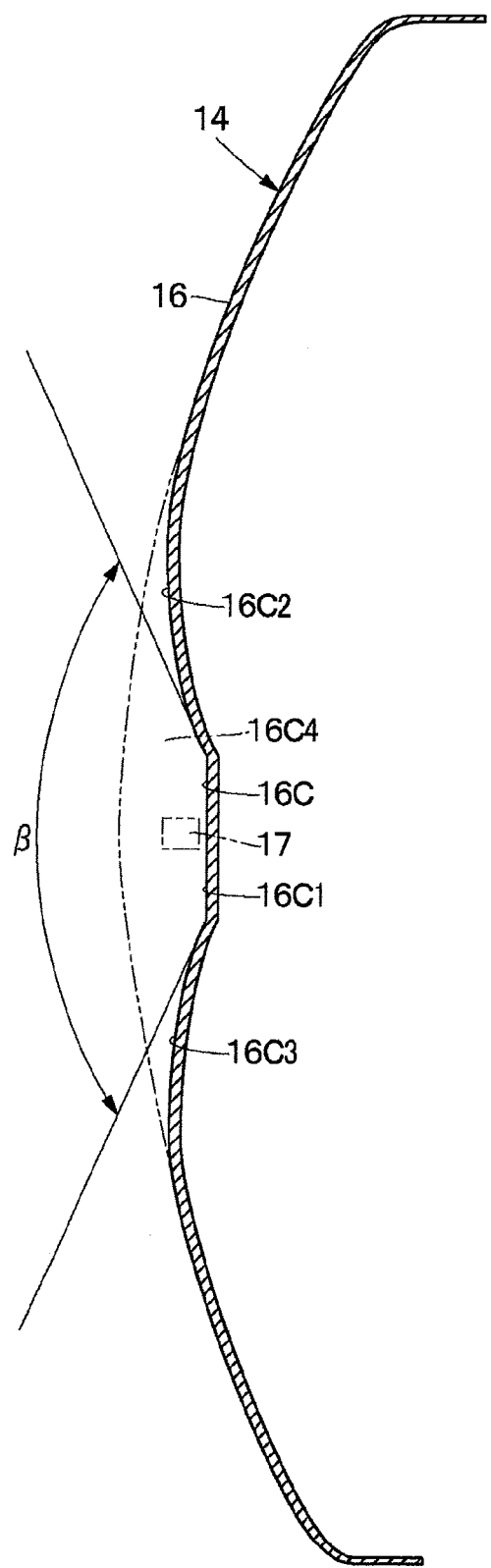
FIG. 12 is a cross section showing the engine cover as a single unit as viewed in the direction of arrows XII-XII in FIG. 6.

Further, a lock device-accommodating recessed portion 16C is provided on the rear surface part 16 in the center position in the left-right direction and in an upper side position of the notched portion 16B. The lock device-accommodating recessed portion 16C is formed to be recessed from the rear surface part 16 toward the engine 8 side (inner direction). That is, as shown in FIG. 12, the lock device-accommodating recessed portion 16C is formed to be recessed from the rear surface part 16 to a side of the engine 8 such that the transverse section shape becomes a substantially mountainous shape (shape of Mt. Fuji).

The lock device-accommodating recessed portion 16C comprises a substantially squared bottom portion 16C1 positioned in a side of the engine 8 side to extend in the upper-lower direction, a left curved portion 16C2 curvedly extending from a left end edge of the bottom portion 16C1 to the left side, a right curved portion 16C3 curvedly extending from a right end edge of the bottom portion 16C1 to the right side, and an inclined portion 16C4 obliquely backward extending from a top end edge of the bottom portion 16C1. The lock device-accommodating recessed portion 16C can accommodate the lock device 27 including a latch 33 in a lock state where the striker 28 and the latch 33 in the lock device 27 are engaged. As a result, the lock device-accommodating recessed portion 16C prevents the lock device 27, particularly the latch 33 from projecting from the rear surface part 16, and is thus configured such that the lock device 27 does not interfere with obstacles at a revolving operation.

Further, as shown in FIG. 7 and the like, the bottom portion 16C1 of the lock device-accommodating recessed portion 16C is provided with a recessed portion 16C5 formed by recessing a portion thereof closer to the upper side to a further inner side. The recessed portion 16C5 acts to secure a clearance to the bottom portion 16C1 of the lock device-accommodating recessed portion 16C in such a manner that at the time of operating an engaging lever 33E of the latch 33, the engaging lever 33E is easy to grab. The bottom portion 16C1 of the lock device-accommodating recessed portion 16C is provided with two bolt through holes (not shown) positioned in the lower side of the recessed portion 16C5, and a striker bolt 29 to be described later (see FIG. 7) is inserted into each of the bolt through holes for fixing the striker 28.

A camera opening 16C6 in a substantially squared shape as a shooting bore of the rear-view camera 17 to be described later is provided in the upper position of the lock device-accommodating recessed portion 16C, that is, in the inclined portion 16C4. As shown in FIG. 7, the camera opening 16C6 is formed as a through hole in the inclined portion 16C4, and is opened obliquely downward in the upper position of the lock device-accommodating recessed portion 16C. The rear-view camera 17 is arranged toward the oblique downward side to oppose the camera opening 16C6. Therefore the view of the rear-view camera 17 in the upper-lower direction can be directed downward as shown in an angle α in FIG. 7, and the rear-view camera 17 can shoot the vicinity of the rear end edge in the counterweight 7 backward of the upper revolving structure 3.

In addition to it, in a state where the lock device 27 is locked (in a state where the latch 33 is engaged to the striker 28) for locking the engine cover 14, the camera opening 16C6 is opened at a higher position by a dimension L in the upper-lower direction in FIG. 7 than the latch 33 in the lock device 27. As a result, in a state where the latch 33 is engaged to the striker 28, it is possible to restrict for the latch 33 to block the view of the rear-view camera 17 to widely ensure the view.

Next, the configuration of the rear-view camera 17 and the mounting structure will be explained.

Figure 9:
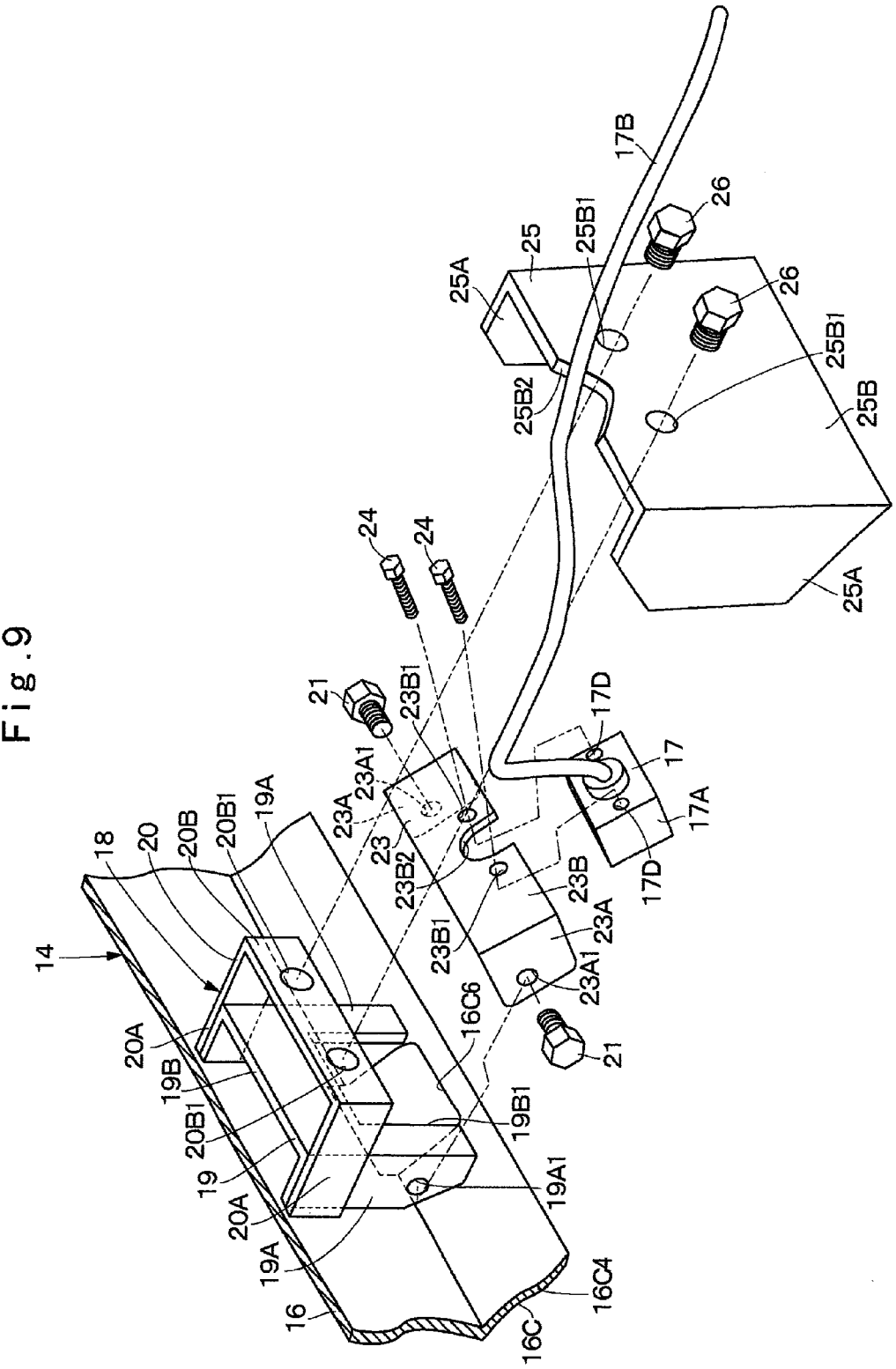
FIG. 9 is an exploded perspective view shown by enlarging the cover side bracket, the camera side bracket, the rear-view camera, the inner cover, and the like in FIG. 8.

That is, designated at 17 is the rear-view camera provided in the engine cover 14. The rear-view camera 17 shoots the backward of the upper revolving structure 3, and is configured of, for example, a wired CCD camera. The rear-view camera 17 shoots a backward range of the counterweight 7 as a dead zone for an operator in the cab 6, and an image shot by the rear-view camera 17 is transmitted through a camera cable 17B extending forward from a camera body 17A to the display device in the cab 6. The camera cable 17B is located to extend in the front-rear direction under the top surface part 15 of the engine cover 14 by a plurality of cable hooks 17C (only one piece is shown in FIG. 6 and FIG. 7) mounted in an inner side (lower side) of the top surface part 15 in the engine cover 14 by intervals. The camera body 17A is provided with female screw holes 17D into which bolts 24 are threaded for mounting the rear-view camera 17 to the camera side bracket 23 (refer to FIG. 9).

Here, the rear-view camera 17 is mounted to the lock device-accommodating recessed portion 16C in a position corresponding to the camera opening 16C6 inside of the engine cover 14. In this case, the rear-view camera 17 is arranged toward the oblique downward side, and the view of the rear-view camera 17 in the upper-lower direction is directed downward as shown in an angle α in FIG. 7.

Indicated at 18 is the cover side bracket, and the cover side bracket 18 is fixed to the inner surface side (side of the engine 8) of the rear surface part 16 in the engine cover 14 to be positioned above the lock device-accommodating recessed portion 16C. The cover side bracket 18 comprises a body portion 19 on which the camera side bracket 23 to be described later is mounted, and a cover mounting portion 20 which is fixed on the body portion 19 and on which an inner cover 25 to be described later is mounted.

The body portion 19 is formed in a U-letter shape as a whole by performing bending work to, for example, a plate member of a steel plate or the like, and comprises a pair of leg portions 19A, and a front surface portion 19B connecting front end edges of the respective leg portions 19A. The leg portions 19A respectively are provided with bolt through holes 19A1 for inserting bolts 21 for mounting the camera side bracket 23 to be described later to the cover side bracket 18. For example, a welding nut (not shown) threaded into the bolt 21 is provided to be fixed to an inner surface of each leg portion 19A (surface to a side of the camera opening 16C6) to correspond to the bolt through hole 19A1. The front surface portion 19B is provided with a substantially squared-shaped notch 19B1 in a section corresponding to the camera opening 16C6. As shown in FIG. 7, the rear-view camera 17 is inserted into the notch 19B1.

The cover mounting portion 20 is formed in a U-letter shape as a whole by performing bending work to, for example, a plate member of a steel plate or the like, and comprises a pair of leg portions 20A, and a front surface portion 20B connecting front end edges of the respective leg portions 20A. A rear end side of each leg portion 20A is fixed to an upper end side of the leg portion 19A in the body portion 19 by, for example, welding means, and each leg portion 20A is fixed to the rear surface part 16 of the engine cover 14 as well as the leg portion 19A of the body portion 19 by, for example, welding means. The front surface portion 20B is provided with a pair of bolt through holes 20B1 for inserting bolts 26 to be described later for mounting the inner cover 25 to be described later to the cover side bracket 18. For example, a welding nut 22 (refer to FIG. 7) threaded into the bolt 26 is provided to be fixed to a rear surface of the front surface portion 20B to correspond to the bolt through hole 20B1.

Indicated at 23 is the camera side bracket provided in the body portion 19 of the cover side bracket 18 in such a manner that the mounting angle thereto can be adjusted in the upper-lower direction. The camera side bracket 23 is formed in a U-letter shape as a whole by performing bending work to, for example, a plate member of a steel plate or the like, and comprises a pair of leg portions 23A, and a front surface portion 23B connecting front end edges of the respective leg portions 23A. The leg portions 23A are respectively provided with bolt through holes 23A1 for inserting the bolts 21. The front surface portion 23B is provided with a pair of bolt through holes 23B1 through which bolts 24 are inserted for mounting the rear-view camera 17 to the camera side bracket 23. The front surface portion 23B is provided with a U-letter-shaped notch 23B2 between the bolt through holes 23B1, and owing to the notch 23B2, a connecting section between the camera body 17A and the camera cable 17B does not interfere with the front surface portion 23B.

Here, the camera side bracket 23 is mounted angularly adjustably to the body portion 19 (leg portion 19A) of the cover side bracket 18 by the bolts 21. The rear-view camera 17 is fixed to the front surface portion 23B of the camera side bracket 23 by the bolts 24. Therefore the rear-view camera 17 is angularly adjustably mounted through the camera side bracket 23 and the cover side bracket 18 to the engine cover 14. The angular adjustment of the rear-view camera 17 can be performed by rotating (swing) the camera side bracket 23 in the upper-lower direction around the bolts 21 to the cover side bracket 18. As shown in FIG. 7, the rear-view camera 17 opposes the camera opening 16C6 and is adjusted in such a manner that a necessary range of the backward of the upper revolving structure 3 is covered within an angle α of the view of the rear-view camera 17. In this state, the bolts 21 are fastened to fix the rear-view camera 17 to the engine cover 14 in a desired angle.

Figure 10:
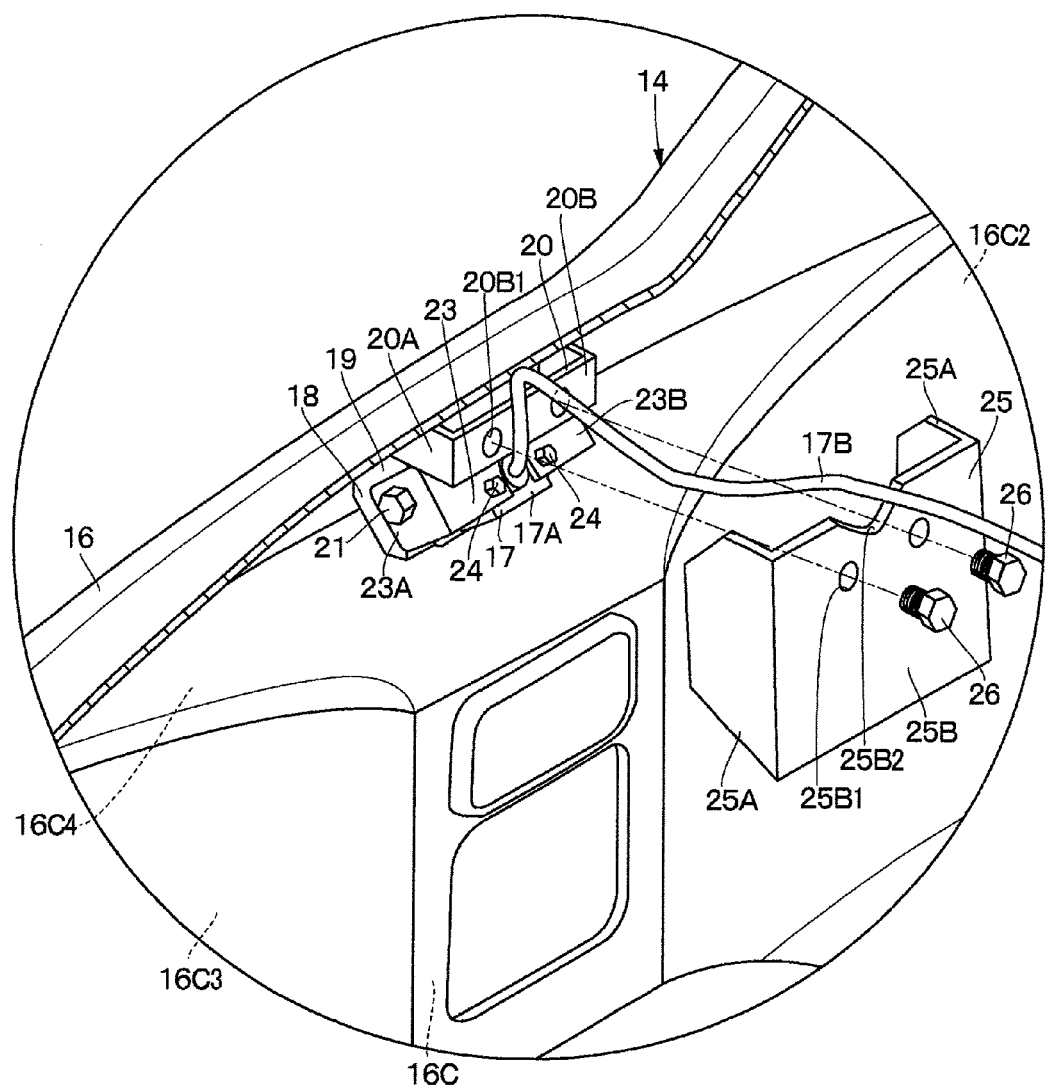
FIG. 10 is an exploded perspective view shown by enlarging a state where the camera side bracket and the rear-view camera are mounted to the cover side bracket in FIG. 8.
Figure 11:
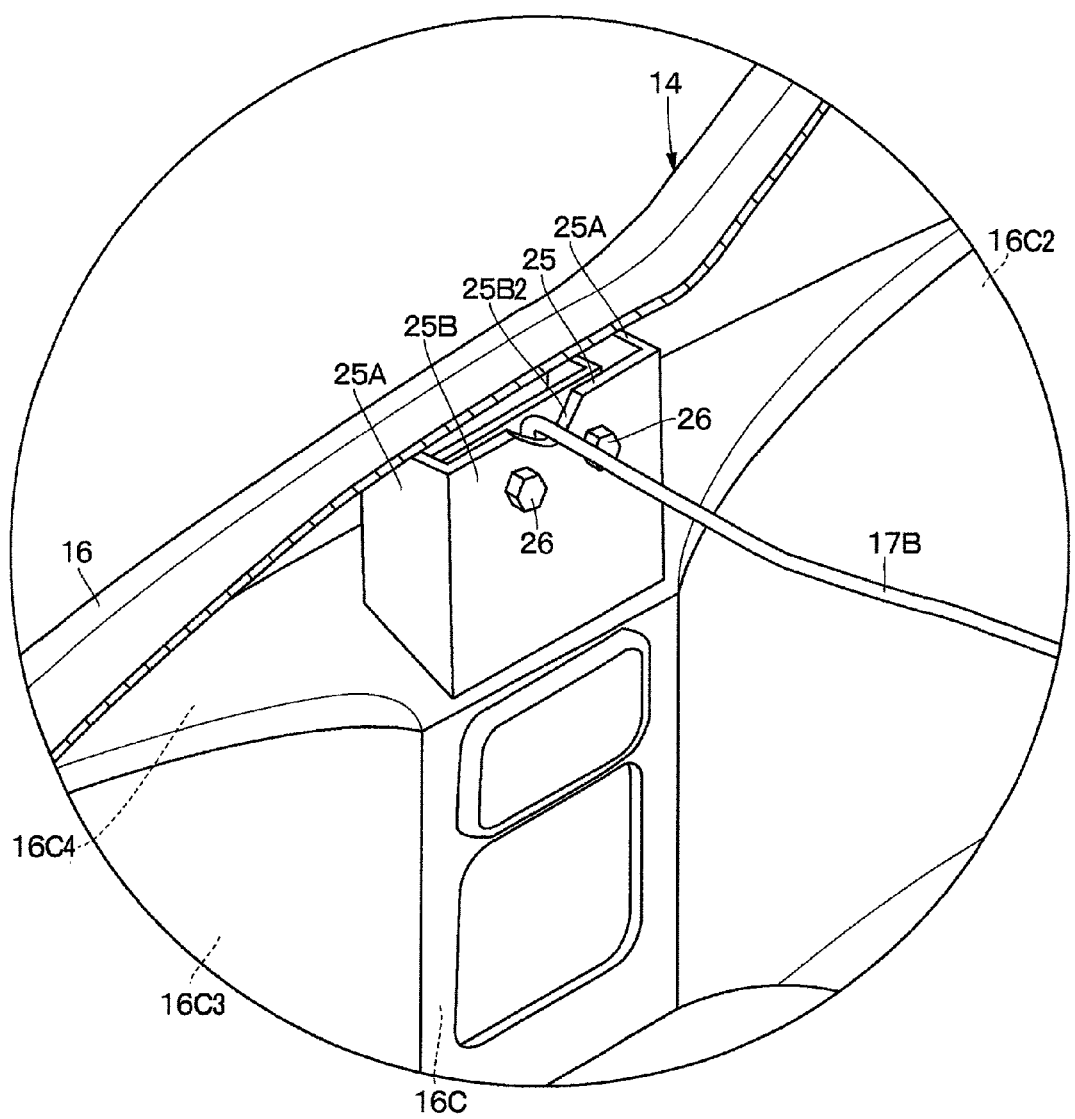
FIG. 11 is a perspective view in a position similar to FIG. 10, showing a state where the camera side bracket, the rear-view camera and the inner cover are mounted to the cover side bracket.

As shown in FIG. 10 and FIG. 11, the inner cover 25 for covering the rear-view camera 17 is mounted to the cover mounting portion 20 of the cover side bracket 18. The inner cover 25 protects the rear-view camera 17 from heat of the engine 8. The inner cover 25 is formed in a U-letter shape as a whole by performing bending work to, for example, a plate member of a steel plate or the like, and comprises a pair of leg portions 25A, and a front surface portion 25B connecting front end edges of the respective leg portions 25A. The respective leg portions 25A cover the rear-view camera 17 from both sides in the left-right direction, and a rear end edge of each leg portion 25A is close to or makes contact with the rear surface part 16 of the engine cover 14 and the inclined portion 16C4 of the lock device-accommodating recessed portion 16C.

The front surface portion 25B covers a front side (side where the camera cable 17B is pulled out) of the rear-view camera 17, and the front surface portion 25B is provided with a pair of bolt through holes 25B1 for inserting bolts 26 for mounting the inner cover 25 to the cover side bracket 18. The front surface portion 25B has a top end edge provided with a notch 25B2 for pulling out the camera cable 17B. It should be noted that a heat insulating material can be provided in the inner cover 25 as needed, therefore, the rear-view camera 17 can be certainly protected from heat of the engine 8.

Next, the configuration of the lock device 27 for locking the engine cover 14 will be described.

That is, designated at 27 is the lock device provided between the counterweight 7 and the engine cover 14, for lockably/unlockably locking the engine cover 14 to the counterweight 7 in a state where the engine cover 14 is closed. The lock device 27 is configured by the striker 28, which will be described later, provided on the rear surface part 16 of the engine cover 14, the bracket 31 provided on the counterweight 7, the latch 33 mounted to the bracket 31, and the hiding member 35 mounted to the bracket 31.

Figure 14:
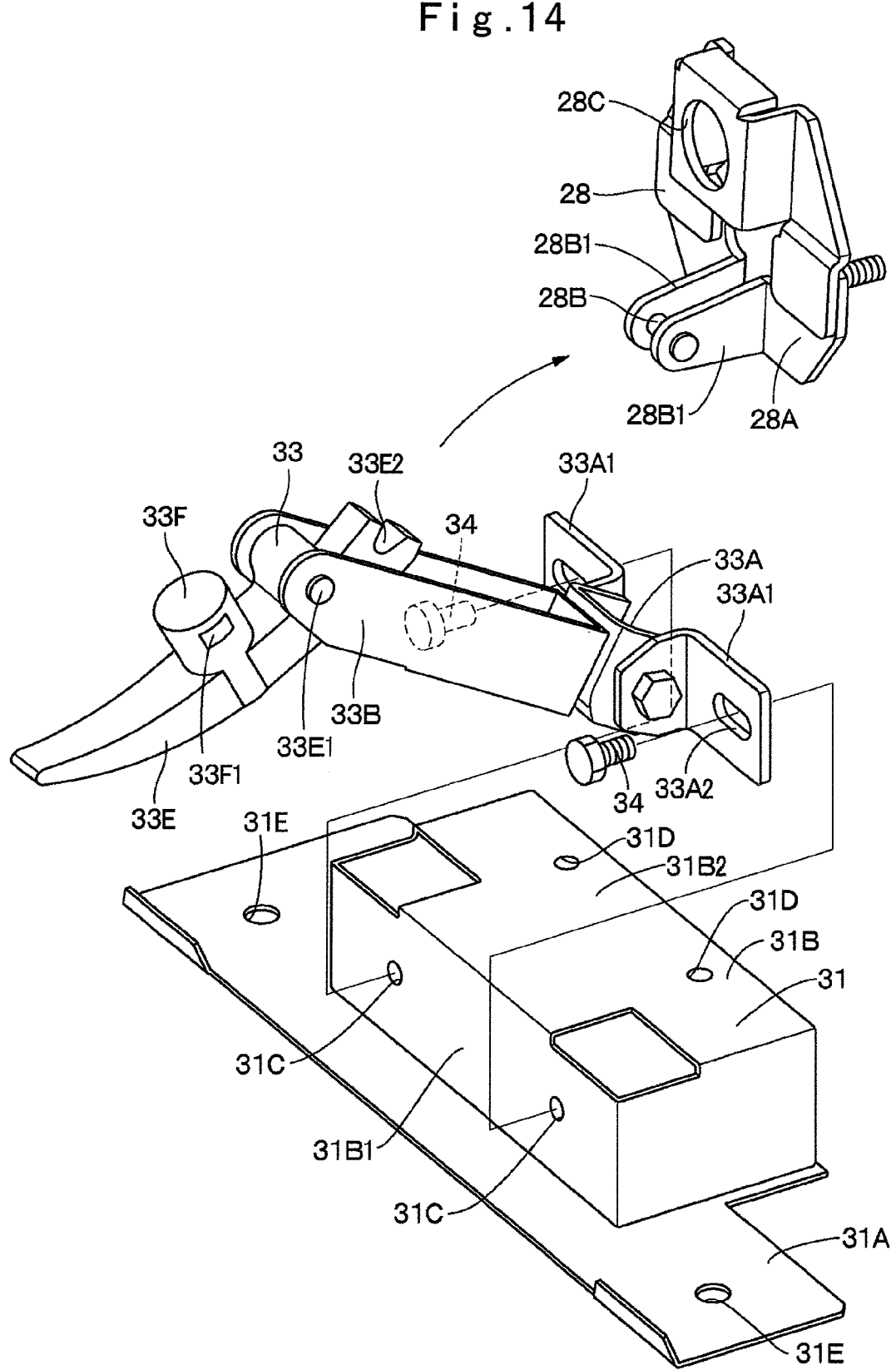
FIG. 14 is an external perspective view showing a state where the bracket, the striker and the latch in the lock device are disconnected.
Figure 15:
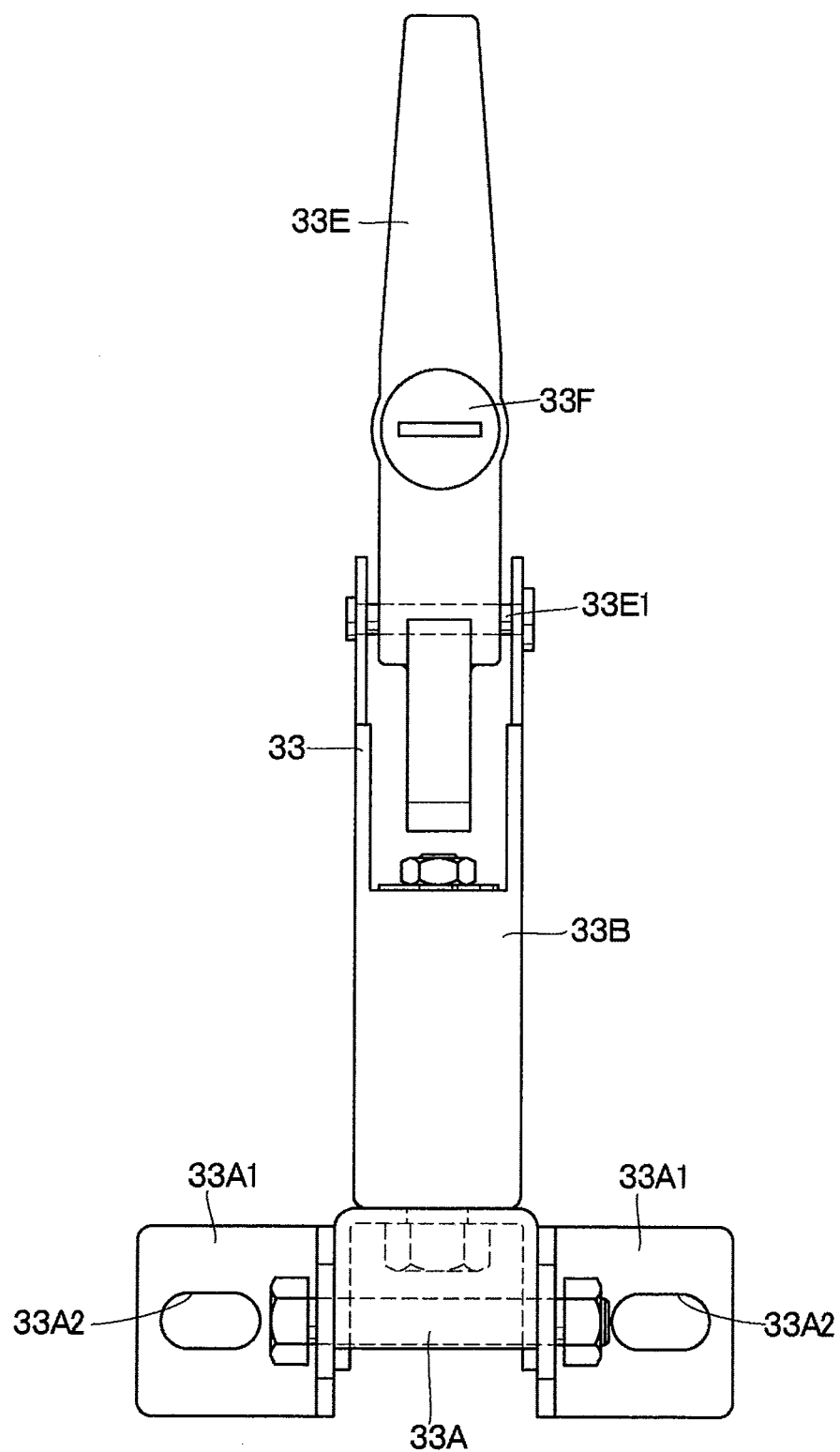
FIG. 15 is a front view shown by enlarging the latch in the lock device as a single unit.
Figure 16:
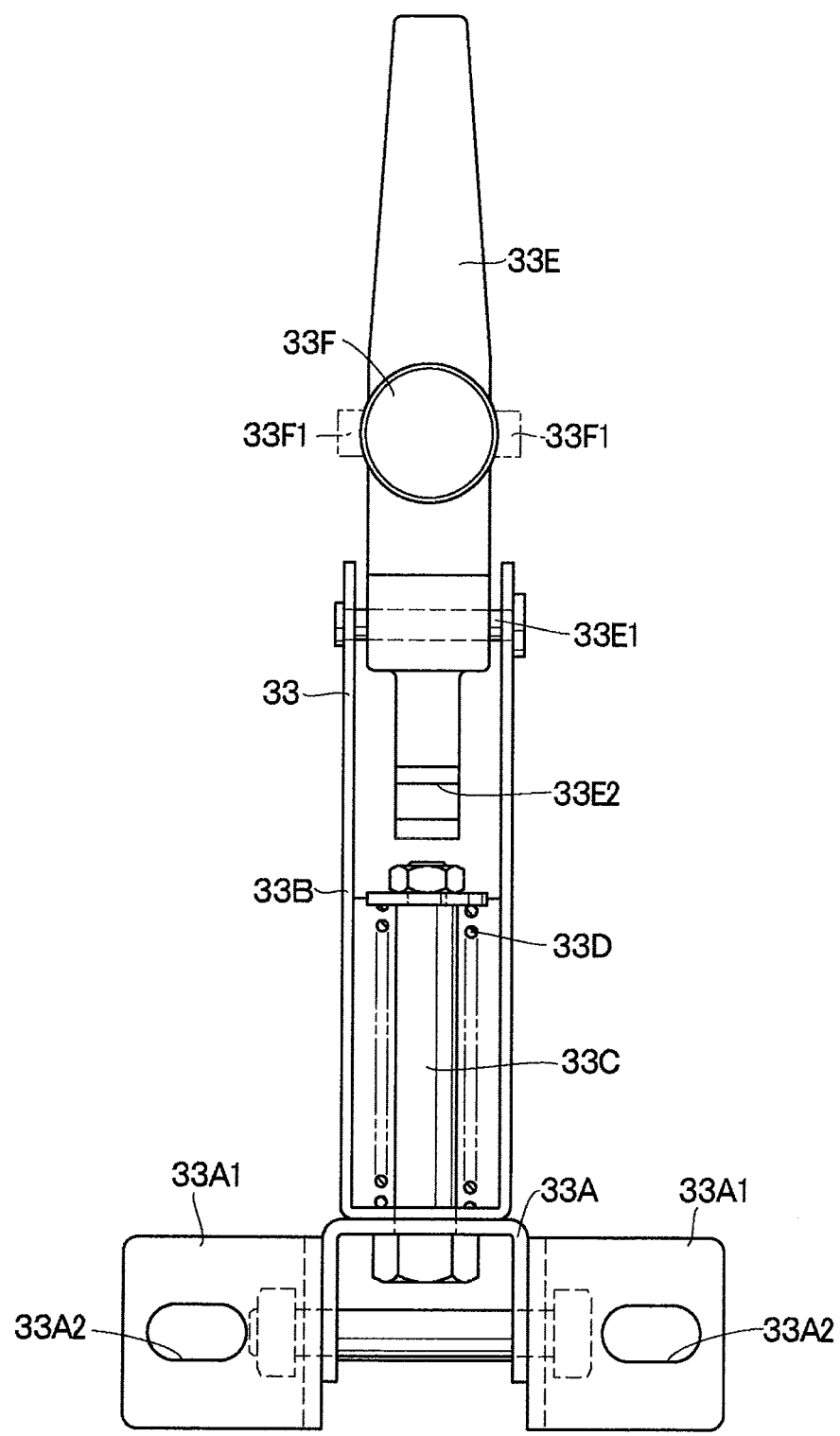
FIG. 16 is a back view shown by enlarging the latch in the lock device as a single unit.

The striker 28 is provided in the center position of the rear surface part 16, and the striker 28 is positioned downward of the recessed portion 16C5 and is mounted to the lock device-accommodating recessed portion 16C. As shown in FIG. 14, the striker 28 is configured by a flat mounting plate 28A, an engaging pin 28B mounted in distal ends of a pair of projections 28B1 positioned downward of the mounting plate 28A and projecting backward from a rear surface of the mounting plate 28A, and a circular cylinder through hole 28C positioned in an upper side of the mounting plate 28A and provided on the rear surface of the mounting plate 28A.

As shown in FIG. 7, striker bolts 29 are provided on a front surface of the mounting plate 28A. The striker bolt 29 has the structure of being incapable of being loosened from an outside of the mounting plate 28A. That is, the striker bolt 29 is formed, for example, by a welding bolt provided to extend forward from the mounting plate 28A.

Here, the striker 28 is fixed to the rear surface part 16 by inserting the striker bolts 29 into the bolt through holes provided in the lock device-accommodating recessed portion 16C of the rear surface part 16 and threading nuts 30 into the striker bolts 29 from the inside of the rear surface part 16. In this mounting structure, for the striker bolts 29, the nut 30 can be loosened only from the inside of the rear surface part 16 of the engine cover 14. That is, the striker bolt 29 cannot be removed in a state where the engine cover 14 is closed.

The bracket 31 is provided on the top surface 7B1 of the center weight portion 7B forming part of the counterweight 7. As shown in FIG. 13, the bracket 31 is formed of a lower surface plate 31A extending in the left-right direction, and a square-shaped projecting portion 31B in a rectangular shape formed on the lower surface plate 31A. A latch mounting surface 31B1 forming the rear side of the square-shaped projecting portion 31B is provided with two female screw holes 31C using welding nuts 31C1, which are formed having an interval therebetween in the left-right direction. On the other hand, a hiding member mounting surface 31B2 forming the upper side of the square-shaped projecting portion 31B is provided with two female screw holes 31D, using welding nuts 31D1, which are formed having an interval therebetween in the left-right direction. Further, the lower surface plate 31A is provided with left and right bolt through holes 31E formed thereon to sandwich the square-shaped projecting portion 31B therebetween.

The bracket 31 as thus configured is mounted to the counterweight 7 by inserting bracket bolts 32 as bracket fixing tools into the respective bolt through holes 31E and threading the bracket bolts 32 into female screw holes 7B2 provided on the top surface 7B1 of the center weight portion 7B forming part of the counterweight 7.

The latch 33 is provided in the bracket 31. As shown in FIG. 7, the latch 33 is located in the rear side of the counterweight 7 to be accommodated closer to the inside than the outer peripheral surface 7A of the counterweight 7. As shown in FIG. 7, FIG. 14, FIG. 15 and FIG. 16, the latch 33 is configured by a mounting portion 33A provided with left and right leg bodies 33A1 rotatable in the upper-lower direction and in the front-rear direction, a movable portion 33B telescopically mounted in the mounting portion 33A, a connecting rod 33C accommodated in the movable portion 33B and connecting the movable portion 33B to the mounting portion 33A, a spring member 33D provided between the connecting rod 33C and the movable portion 33B and comprising a compression spring urging the movable portion 33B to be closer to the mounting portion 33A, an engaging lever 33E rotatably mounted through a pin 33E1 to the distal end portion of the movable portion 33B at the intermediate portion thereof in a longitudinal direction, and a key cylinder 33F mounted in the intermediate portion of the engaging lever 33E and closer to the distal end side than the pin 33E1.

The bolt through hole 33A2 is formed in the respective leg bodies 33A1 of the mounting portion 33A. On the other hand, a groove portion 33E2 is formed in the base end portion of the engaging lever 33E for being engaged to the engaging pin 28B of the striker 28. Further, the key cylinder 33F is formed as a columnar body inserted into the cylinder through hole 28C of the striker 28 in a locking state shown in FIG. 7. A key (not shown) inserted into the key cylinder 33F is rotated to project pawl portions 33F1 (shown in a two-dot chain line of FIG. 16), thus making it possible to lock the lock device 27 to a retaining state, and by reversely rotating the key to pull in the pawl portions 33F1, the lock device 27 can be unlocked.

In regard to the latch 33, the latch bolts 34 as the latch fixing tools are inserted into the bolt through holes 33A2 of the mounting portion 33A, and the bolts 34 are threaded into the female screw holes 31C provided in the latch mounting surface 31B1 of the square-shaped projecting portion 31B forming part of the bracket 31. Thereby the latch 33 can be mounted on the bracket 31.

The hiding member 35 provided on the upper side of the bracket 31. The hiding member 35 covers and hides the bracket bolts 32 and the latch bolts 34. That is, as shown in FIG. 13, the hiding member 35 is configured by a rectangular top plate 35A extending in the left-right direction and forming the top surface of the hiding member 35, and blinding plates 35B hanging down from a rear portion of the top plate 35A. The top plate 35A and the blinding plates 35B are provided with a notched groove 35C positioned in the center portion in the left-right direction, and the notched groove 35C forms part of a relief groove for the latch 33 at the time the latch 33 rises up.

Here, the top plate 35A is formed of a center plate portion 35A1, and side plate portions 35A2 extending obliquely downward from both of left and right sides of the center plate portion 35A1. Two bolt through holes 35A3 are formed in a front position of the center plate portion 35A1 to correspond to the respective female screw holes 31D of the bracket 31. The two bolt through holes 35A3 are, at the time of closing the engine cover 14, positioned closer to a side (inside) of the engine 8 than the rear surface part 16 of the engine cover 14, that is, to be hidden in the inside of the engine cover 14.

Further, for example, two cushion members 36 are mounted on the rear position of the top plate 35A. Each cushion member 36, at the time of closing the engine cover 14, makes contact with the lower end portion 16A of the rear surface part 16 to absorb a shock.

The hiding member 35 is mounted to the bracket 31 by inserting the hiding member bolts 37 as the hiding member fixing tools into the blot through holes 35A3 of the top plate 35A and threading the hiding member bolts 37 into the female screw holes 31D provided on the hiding member mounting surface 31B2 of the square-shaped projecting portion 31B. In this way, in a state where the hiding member 35 is mounted to the bracket 31, each bracket bolt 32 can be covered and hidden by each side plate portion 35A2 of the top plate 35A. On the other hand, the latch bolts 34 can be covered and hidden by the blinding plates 35B.

Further, as shown in FIG. 7, the hiding member bolts 37 for mounting the hiding member 35 to the bracket 31 are arranged closer to the inside than the lower end portion 16A of the rear surface part 16 in the closed engine cover 14. In detail, the hiding member bolts 37 is arranged closer to a side of the engine 8 than a position where the seal member 16D provided in the distal end of the lower end portion 16A of the rear surface part 16 makes contact with the top plate 35A of the hiding member 35, that is, inside (in the front side) of the rear surface part 16, so that the hiding member bolts 37 can be hidden from outside.

The lock device 27 is configured in this way, and as shown in a two-dot chain line of FIG. 7, the groove portion 33E2 of the engaging lever 33E forming part of the latch 33 is engaged to the engaging pin 28B of the striker 28 in a state where the engine cover 14 is closed, and the distal end of the engaging lever 33E is rotated toward the striker 28 in an arrow W direction to rise up. Therefore, the latch 33 can be arranged in the lock position where the key cylinder 33F is inserted into the cylinder through hole 28C of the striker 28. In a state where the latch 33 is arranged in the lock position, the latch 33 can be locked in a retaining state or unlocked by inserting the key into the key cylinder 33F and rotating the key therein.

Further, the lock device 27 is arranged to be inclined to be closer to the engine 8 in the upper direction in a state where the engine cover 14 is locked to the counterweight 7 as described above. That is, as shown in FIG. 7, a centerline O-O of the lock device 27 in the upper-lower direction is inclined to the front side (side of the engine 8) by an angle θ to a vertical line Z-Z. This arrangement prevents the lock device 27 from blocking the view of the rear-view camera 17.

In addition to it, by inclining the lock device 27, it is possible to restrict for the lock device 27 to be disengaged due to vibrations (the engagement between the striker 28 and the latch 33 is released) also at an unlocked time. That is, by inclining the lock device 27, forces added by the own weight of the lock device 27 and a reaction of the spring member 33D can be shifted from a direction of releasing the locking of the lock device 27 (direction of releasing the engagement between the striker 28 and the latch 33). As a result, it can be made difficult to release the locking of the lock device 27 also at an unlocked time.

It should be noted that, as shown in FIG. 2, the operating oil tank 38 is positioned in front of the hydraulic pump 9 and is provided on the revolving frame 5. The operating oil tank 38 reserves therein operating oil to be supplied to the hydraulic pump 9. A fuel tank 39 is provided laterally to the operating oil tank 38.

The hydraulic excavator 1 according to the first embodiment is configured as described above, and next, an operation of the hydraulic excavator 1 will be explained.

First, an operator gets onto the cab 6 and sits on an operator's seat. When the operator operates the traveling lever in this state to drive the lower traveling structure 2, the operator can advance or retreat the hydraulic excavator 1. On the other hand, the operator seated on the operator's seat operates an operating lever to operate the working mechanism 4 or the like, thus making it possible to perform an excavating work of earth and sand or the like.

At this time, the rear-view camera 17 mounted to the rear end side of the inner side in the engine cover 14 shoots the backward of the counterweight 7 as a dead zone for an operator in the cab 6, and an image shot by the rear-view camera 17 is displayed on the display device arranged in the cab 6. Therefore the operator operating the hydraulic excavator 1 in the cab 6 can confirm (monitor) the backward of the counterweight 7 with the image displayed on the display device to enhance safety of the excavating work and the like.

Next, an operation at the time of opening/closing the engine cover 14 will described for performing a maintenance work of the engine 8 or the like. An operator inserts the key into key cylinder 33F of the latch 33 and rotates the key therein to unlock the lock device 27, and in this state, the operator grabs the distal end side of the engaging lever 33E and pulls it down toward the operator side. Therefore the engagement between the groove portion 33E2 of the engaging lever 33E and the engaging pin 28B of the striker 28 can be released to lift and open the engine cover 14.

On the other hand, when the maintenance work of the engine 8 is finished and the engine cover 14 is closed, the groove portion 33E2 of the engaging lever 33E is engaged to the engaging pin 28B of the striker 28, and the engaging lever 33E is made to rise up in this state. As a result, the engaging lever 33E is engaged to the engaging pin 28B, thus making it possible to lock the engine cover 14 in such a manner that it cannot open. Further, by inserting the key into the key cylinder 33F of the latch 33 and rotating the key therein, the lock device 27 can be locked.

Incidentally, the rear-view camera 17 according to the present embodiment is assembled to the engine cover 14 according to the following procedure. The rear-view camera 17 is fixed to the front surface portion 23B of the camera side bracket 23 by using the bolts 24. The camera side bracket 23 having fixed the rear-view camera 17 is mounted to the cover side bracket 18 fixed to the inner surface side of the rear surface part 16 in the engine cover 14 by using the bolts 21. At this time, the angular adjustment of the rear-view camera 17 is performed by rotating (rocking) the camera side bracket 23 in the upper-lower direction around the bolts 21 to the cover side bracket 18.

In this case, as shown in FIG. 7, the rear-view camera 17 opposes the camera opening 16C6 and is adjusted in such a manner that a necessary range of the backward of the upper revolving structure 3 is included within an angle α of the view of the rear-view camera 17. In this state, the bolt 21 is fastened to fix the rear-view camera 17 to the engine cover 14 in a desired angle. As the rear-view camera 17 is fixed in the desired angle, the inner cover 25 is mounted to the cover side bracket 18 by using the bolts 26.

Thus, according to the present embodiment, since the rear-view camera 17 is mounted to the inner surface side (side of the engine 8) of the engine cover 14 even if the exclusive cover for the rear-view camera is not provided, the rear-view camera 17 can be protected from collision with earth and sand, stones, rocks and the like by the engine cover 14 having sufficient rigidity and strength. Protection of the rear-view camera 17 from irregular disassembling and stealing can be performed by the lock device 27 for locking the engine cover 14 to the counterweight 7 without separately providing the protection mechanism exclusive for the rear-view camera as conventional art.

Accordingly, the exclusive cover for the rear-view camera as conventional art and the mechanism for protecting the rear-view lo camera from irregular disassembling and stealing can be omitted (eliminated) to reduce costs due to installation of the rear-view camera 17. In addition, this configuration has no possibility that the view of the operator is blocked by the exclusive cover of the rear-view camera as conventional art, making it possible to reduce the dead zone when the operator views the backward virtually. Further, since it is not required to provide the recessed portion in the counterweight, a reduction in volume and weight of the counterweight can be prevented.

The lock device-accommodating recessed portion 16C recessed to a side of the engine 8 is provided in the rear surface part 16 of the engine cover 14, and the rear-view camera 17 is mounted in the upper position of the lock device-accommodating recessed portion 16C in a position corresponding to the camera opening 16C6. Therefore the section for mounting the rear-view camera 17 can be provided, for example, not to project backward from the rear surface part 16 of the engine cover 14 to protect the peripheral section of the rear-view camera 17 from being collided with falling rocks and the like.

Since the lock device-accommodating recessed portion 16C is recessed to the side of the engine 8, the view of the rear-view camera 17 can be widely ensured from the camera opening 16C6 provided in the upper position of the lock device-accommodating recessed portion 16C. In this case, as shown in FIG. 12, an angle β as an opening angle between the left curved portion 16C2 and the right curved portion 16C3 of the lock device-accommodating recessed portion 16C is made larger than the view of the rear-view camera 17 in the left-right direction. As a result, the view of the rear-view camera 17 in the left-right direction can be ensured.

According to the present embodiment, the camera opening 16C6 is configured to be opened obliquely downward in the upper position of the lock device-accommodating recessed portion 16C. According to this configuration, the rear-view camera 17 can be arranged in the obliquely downward direction. As a result, the rear-view camera 17 can shoot the vicinity of the rear end edge in the counterweight 7 at the backward of the upper revolving structure 3 to prevent the surroundings of the rear end edge in the counterweight 7 from becoming the dead zone of the rear-view camera 17.

According to the present embodiment, as shown in FIG. 7, in a state where the latch 33 is engaged to the striker 28 for locking the engine cover 14, the camera opening 16C6 is opened at a higher position by a dimension L than the latch 33. According to this configuration, in a state where the latch 33 is engaged to the striker 28, it can be restricted for the latch 33 to block the view of the rear-view camera 17, thus ensuring the view of the rear-view camera 17 widely.

According to the present embodiment, the lock device 27 is inclined to come closer to the side of the engine 8 toward the upward side, and therefore it is possible to restrict for the lock device 27 to block the view of the rear-view camera 17 under the rear-view camera 17. According to this configuration, the view of the rear-view camera 17 can be ensured to reduce the dead zone even if the lock device 27 is arranged under the rear-view camera 17.

According to the present embodiment, the rear-view camera 17 is angularly adjustably mounted through the camera side bracket 23 and the cover side bracket 18 to the engine cover 14. Therefore, the rear-view camera 17 can be mounted to the engine cover 14 in a desired angle and in a desired view even if a degree of dimension accuracy of the engine cover 14 or a degree of mounting accuracy of the cover side bracket 18 (without maintaining a higher degree of accuracy) is reduced. As a result an individual difference in the mounting position of the rear-view camera 17 can be reduced, and a reduction in costs due to the installation of the rear-view camera 17 can be made.

According to the present embodiment, since the inner cover 25 is configured to cover the rear-view camera 17, the inner cover 25 can protect the rear-view camera 17 from heat of the engine 8. In this case, since the inner cover 25 is not required to be as strong as to endure collision with earth and sand, stones, rocks and the like, the inner cover 25 can be made of a material in a low cost.

The present embodiment is explained by taking a case of using the engine 8 as the prime mover, and driving the hydraulic pump 9 by the engine 8, as an example. However, the present invention is not limited thereto, and configuration may be provided by using an electric motor as the prime mover to drive the hydraulic pump 9 by the electric motor.

The present embodiment is explained by taking a case of being applied to the hydraulic excavator 1 of a cab type equipped with the cab 6 provided in the upper revolving structure 3, as an example. However, the present invention is not limited to the same, but, for example, the present invention may be applied to a hydraulic excavator of a canopy type covering at least only an upper side of an operator's seat.

Further, the present embodiment is explained by taking a case of using the hydraulic excavator 1 of a crawler type as the construction machine as an example. However, the present invention is not limited to the same, but, for example, the present invention may be applied to a hydraulic excavator equipped with a lower traveling structure of a wheel type. Further, the present invention may be widely applied to the other construction machine equipped with a prime mover such as a hydraulic crane.

DESCRIPTION OF REFERENCE NUMERALS

1: Hydraulic excavator (Construction machine)
2: Lower traveling structure
3: Upper revolving structure
4: Working mechanism
5: Revolving frame
7: Counterweight
8: Engine (Prime mover)
9: Hydraulic pump
11: Exterior cover
12: Left side door
13: Right side door
14: Engine cover (Prime mover cover)
15: Top surface part
16: Rear surface part
16C: Lock device-accommodating recessed portion
16C6: Camera opening
17: Rear-view camera
18: Cover side bracket
23: Camera side bracket
25: Inner cover
27: Lock device
28: Striker
31: Bracket
31B1: Latch mounting surface
33: Latch

What is claimed is:
1. A construction machine comprising:
an automotive lower traveling structure;
an upper revolving structure swingably mounted on said lower traveling structure; and
a working mechanism mounted to said upper revolving structure capable of tilting up and down,
wherein said upper revolving structure comprises:
a revolving frame forming a support structure,
a counterweight having an outer peripheral surface in an arc shape and located in a rear side of said revolving frame as a weight balance to said working mechanism,
a prime mover positioned in a front side of said counterweight and mounted on said revolving frame to drive a hydraulic pump,
a prime mover cover including a top surface part covering said prime mover from above and a rear surface part hanging down from a rear end of said top surface part and in contact with a top surface of said counterweight, a lock device provided between said counterweight and said prime mover cover for locking said prime mover cover to said counterweight in a state where said prime mover cover is closed, and a rear-view camera provided in said prime mover cover, wherein said lock device is provided on said rear surface part of said prime mover cover in a lock device-accommodating recessed portion of said rear surface part that is recessed toward said prime mover in a position corresponding to said lock device, wherein said lock device-accommodating recessed portion comprises:
- a bottom surface that extends in an upper-lower direction,
- a left curved surface that curvedly extends from a left end edge of said bottom surface in a left direction,
- a right curved surface that curvedly extends from a right end edge of said bottom surface in a right direction, and
- an inclined surface that obliquely extends from a top end edge of said bottom surface away from said prime mover, wherein said lock device comprises:
- a striker provided on said bottom surface of said lock device-accommodating recessed portion,
- a bracket provided on a top surface of said counterweight in which a rear side of said bracket is a latch mounting surface, and
- a latch mounted on said latch mounting surface of said bracket, in which said latch is provided with an engaging lever to engage said striker so that said striker and said latch are engaged outside of said prime mover cover in said state where said prime mover cover is closed, wherein a camera opening is provided in said inclined surface of said lock device-accommodating recessed portion and is positioned above said engaging lever, and wherein said rear-view camera is mounted to an inner surface side of said prime mover cover in a position corresponding to said camera opening.

2. The construction machine according to claim 1, wherein said camera opening opens obliquely downwards at said inclined surface of said lock device-accommodating recessed portion.

3. The construction machine according to claim 1, wherein in a state where said latch is engaged to said striker to lock said prime mover cover, said camera opening is opened to said inclined surface which is above said engaging lever of said latch.

4. The construction machine according to claim 1, wherein, in a state of locking said prime mover cover to said counterweight, said lock device is inclined upwards to come closer to the side of said prime mover to not block a view of said rear-view camera.

5. The construction machine according to claim 1, wherein a cover side bracket is fixed to an inner surface side of said prime mover cover,
wherein a camera side bracket is mounted to said cover side bracket in such a manner that a mounting angle thereof is adjustable in the upper-lower direction, and
wherein said rear-view camera is fixed to said camera side bracket, and is thereby adjustably mounted to said prime mover cover through said camera side bracket and said cover side bracket.

6. The construction machine according to claim 5, wherein an inner cover for covering said rear-view camera is mounted to said cover side bracket.

* * * * *